(12) United States Patent
Chang

(10) Patent No.: US 10,616,635 B2
(45) Date of Patent: *Apr. 7, 2020

(54) MOBILE VIDEO SYSTEM

(71) Applicant: VOXX INTERNATIONAL CORPORATION, Hauppauge, NY (US)

(72) Inventor: Chung Lung Chang, Diamond Bar, CA (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,325

(22) Filed: Oct. 9, 2014

(65) Prior Publication Data

US 2015/0026738 A1  Jan. 22, 2015

Related U.S. Application Data

(63) Continuation of application No. 13/858,695, filed on Apr. 8, 2013, now Pat. No. 8,893,193, which is a
(Continued)

(51) Int. Cl.
*H04N 7/18* (2006.01)
*H04N 21/414* (2011.01)
(Continued)

(52) U.S. Cl.
CPC ......... *H04N 21/41422* (2013.01); *B60N 2/80* (2018.02); *B60R 11/0229* (2013.01);
(Continued)

(58) Field of Classification Search
USPC ..................................................... 725/74–77
See application file for complete search history.

(56) References Cited

U.S. PATENT DOCUMENTS 4,647,980 A * 3/1987 Steventon .......... B64D 11/0015
348/837
4,756,528 A 7/1988 Umashankar
(Continued)

FOREIGN PATENT DOCUMENTS

EP 0976616 8/1999
JP 6415479 1/1989
(Continued)

OTHER PUBLICATIONS

Directed Video Headrest Video Monitor Owner's Manual/Installation Guide HVM500.
(Continued)

*Primary Examiner* — Mulugeta Mengesha
(74) *Attorney, Agent, or Firm* — F. Chau & Associates, LLC

(57) ABSTRACT

A mobile video system is disclosed. The mobile video system includes: a radio that includes a loudspeaker configured to output a signal received by the radio; a video source that generates an audiovisual signal; and a video monitor configured to receive a video portion of the audiovisual signal. The video monitor includes: a housing sized be positioned within the headrest, the housing comprising a first hinge portion and defining a storage cavity; a screen sized and shaped to be positioned within the storage cavity, the screen structure comprising a second hinge portion configured to cooperate with the first hinge portion to secure the screen structure to the housing; a first transmitter configured to transmit an audiovisual signal to a first receiver, wherein the first receiver is the radio; and a second transmitter configured to transmit the audiovisual signal to a second receiver.

20 Claims, 14 Drawing Sheets

Related U.S. Application Data continuation of application No. 12/614,364, filed on Nov. 6, 2009, now Pat. No. 8,429,694, which is a continuation of application No. 10/985,262, filed on Nov. 10, 2004, now Pat. No. 7,636,930, which is a continuation of application No. 10/361,897, filed on Feb. 7, 2003, now Pat. No. 6,871,356.

(60) Provisional application No. 60/435,810, filed on Dec. 20, 2002, provisional application No. 60/421,936, filed on Oct. 28, 2002.

(51) Int. Cl.

| | |
|---|---|
| *B60R 11/02* | (2006.01) |
| *H04N 21/4223* | (2011.01) |
| *H04N 21/4363* | (2011.01) |
| *H04N 21/439* | (2011.01) |
| *H04N 21/462* | (2011.01) |
| *H04N 21/61* | (2011.01) |
| *H04L 29/08* | (2006.01) |
| *H04N 21/214* | (2011.01) |
| *H04N 21/426* | (2011.01) |
| *B60N 2/80* | (2018.01) |
| *H04L 29/06* | (2006.01) |
| *B60R 11/00* | (2006.01) |

(52) U.S. Cl.
CPC .......... *B60R 11/0235* (2013.01); *H04L 67/12* (2013.01); *H04N 21/2146* (2013.01); *H04N 21/4223* (2013.01); *H04N 21/42607* (2013.01); *H04N 21/439* (2013.01); *H04N 21/43632* (2013.01); *H04N 21/43637* (2013.01); *H04N 21/4622* (2013.01); *H04N 21/61* (2013.01); *B60R 2011/0017* (2013.01); *B60R 2011/0276* (2013.01); *H04L 67/38* (2013.01)

(56) References Cited

U.S. PATENT DOCUMENTS

| | | | |
|---|---|---|---|
| 4,774,514 A | 9/1988 | Hildebrandt et al. | |
| 4,866,515 A | 9/1989 | Tagawa et al. | |
| 5,555,466 A * | 9/1996 | Scribner | H04N 7/106 348/706 |
| 5,775,762 A | 7/1998 | Vitito | |
| 5,808,660 A | 9/1998 | Sekine et al. | |
| 5,946,055 A | 8/1999 | Rosen | |
| D413,856 S | 9/1999 | Scribner | |
| 6,056,248 A | 5/2000 | Ma | |
| 6,056,364 A | 5/2000 | De Filippo | |
| 6,115,086 A | 9/2000 | Rosen | |
| 6,124,902 A | 9/2000 | Rosen | |
| 6,125,030 A | 9/2000 | Mola et al. | |
| 6,157,418 A | 12/2000 | Rosen | |
| 6,177,887 B1 | 1/2001 | Jerome | |
| 6,186,459 B1 | 2/2001 | Ma | |
| 6,199,810 B1 | 3/2001 | Wu et al. | |
| 6,246,449 B1 | 6/2001 | Rosen | |
| 6,330,337 B1 | 12/2001 | Nicholson et al. | |
| 6,339,696 B1 * | 1/2002 | Chan | H04B 1/16 386/E5.002 |
| 6,364,390 B1 | 4/2002 | Finneman | |
| D469,413 S | 1/2003 | To et al. | |
| 6,669,285 B1 | 12/2003 | Park et al. | |
| 6,678,892 B1 | 1/2004 | Lavelle et al. | |
| 6,871,356 B2 | 3/2005 | Chang | |
| 6,928,654 B2 | 8/2005 | Tranchina et al. | |
| 7,036,879 B2 | 5/2006 | Chang | |
| 7,044,546 B2 | 5/2006 | Chang | |
| 7,050,124 B2 | 5/2006 | Schedivy | |
| 7,076,204 B2 * | 7/2006 | Richenstein | H04H 20/62 381/14 |
| 7,084,932 B1 | 8/2006 | Mathias et al. | |
| 7,245,274 B2 | 7/2007 | Schedivy | |
| 7,267,402 B2 | 9/2007 | Chang | |
| 7,379,125 B2 | 5/2008 | Chang | |
| 7,448,679 B2 | 11/2008 | Chang | |
| 7,597,393 B1 | 10/2009 | Tuccinardi et al. | |
| 7,667,669 B2 * | 2/2010 | Lavelle | H04B 1/205 345/7 |
| 7,839,355 B2 | 11/2010 | Lavelle et al. | |
| 7,894,003 B2 | 2/2011 | Chang | |
| 8,585,140 B2 | 11/2013 | Chang | |
| 9,114,745 B2 | 8/2015 | Schedivy | |
| 2002/0105507 A1 * | 8/2002 | Tranchina | G06F 3/1423 345/204 |
| 2003/0020840 A1 * | 1/2003 | Hays | H04N 5/268 348/837 |
| 2003/0137584 A1 * | 7/2003 | Norvell | B60R 11/0235 348/61 |
| 2003/0226148 A1 * | 12/2003 | Ferguson | B60R 11/0211 725/75 |
| 2004/0237111 A1 * | 11/2004 | Iraclianos | B60K 35/00 725/75 |
| 2005/0005298 A1 * | 1/2005 | Tranchina | H04N 21/43632 725/81 |
| 2007/0091015 A1 * | 4/2007 | Lavelle | G06F 3/1431 345/55 |

FOREIGN PATENT DOCUMENTS

| | | |
|---|---|---|
| JP | 1-94049 | 4/1989 |
| JP | 2-144242 | 6/1990 |
| JP | 2158437 | 6/1990 |
| JP | 640021 | 10/1994 |
| JP | 741401 | 9/1995 |
| JP | 11151986 | 6/1999 |
| KR | 19990027444 | 7/1999 |
| KR | 20000014983 | 7/2000 |
| KR | 200207307 | 10/2000 |
| KR | 2002556470 | 12/2001 |
| TW | 483319 | 4/2002 |
| WO | 2000/38951 | 7/2000 |

OTHER PUBLICATIONS

Audivox Corporation, LCM640 Owner's Manual and Installation Guide.

Audivox Corporation, LCM640TV Owner's Manual, Flip down LCD In-Vehicle Television Entertainment System.

Claim Construction Order, U.S. District Court, Central District of California, *Johnson Safety, Inc.* (Plaintiff) v. *Voxx International Corporation; Voxx Electronics Corporation; and Invision Automotive Systems Inc.* (Defendants), Case No. 5: 14-cv-02591-ODW(DTB), Nov. 16, 2016, 36 pgs.

Stipulated Constructions of Claim Terms, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants-Counterclaimants), Case No. 14-cv-2591-ODW (DTB), Dec. 1, 2016, 6 pgs.

Plaintiff's Opening Claim Construction Brief for Plaintiff's Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW (DTB), Jan. 8, 2016, 31 pgs.

Parties' Final Joint Claim Chart, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5: 14-cv-02591-ODW(DTBx), Jan. 8, 2016, 6 pgs.

Parties' Proposed Constructions and Supporting Evidence for Disputed Claim Terms of the Patents in Suite, Ex. A to Final Joint Claim Chart, Case No. 5:14-cv-02591-ODW-DTB, Jan. 8, 2016, 37 pgs.

(56) References Cited

OTHER PUBLICATIONS

Plaintiff's Reply Claim Construction Brief for Plaintiff's Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW(DTB), Jan. 25, 2016, 18 pgs.
Plaintiff's Responsive Claim Construction Brief for Defendants' Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW (DTB), Jan. 19, 2016, 30 pgs.
Voxx's Opening Claim Construction Brief, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5:14-cv-2591-ODW-DTB, Jan. 8, 2016, 29 pgs.
Voxx's Responsive Claim Construction Brief, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-2591-ODW(DTBx, Jan. 19, 2016, 11 pgs.
Voxx's Reply to Johnson Safety's Response to Voxx's Opening Claim Construction Brief, U.S. District Court for the Central District of California, *Johnson Safety, Inc.* (Plaintiff-Counterdefendant) v. *Voxx International Corporation; Voxx Electronics Corporation; and Invision Automotive Systems Inc.* (Defendants—Counterclaimants), Case No. 5:14-cv-2591-ODW-DTB, Jan. 25, 2016, 17 pgs.
Joint Appendix of Extrinsic Evidence, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-02591-ODW (DTBx), Jan. 25, 2016, 4 pgs.
JSI Extrinsic Evidence: Exhibits C-H, Exhibit O, Exhibit Q, Jan. 25, 2016, Case No. 5:14-cv-02591-ODW-DTB, 74 pgs.
Voxx Extrinsic Evicence: Exhibit A, Jan. 25, 2016, Case No. 5:14-cv-02591-ODW-DTB, 15 pgs.
Petition for Inter Partes Review of U.S. Pat. No. 8,585,140 Under 35 U.S.C. 311-319 and 37 C.F.R. 42, *Voxx International Corporation* (Petitioner) v. *Johnson Safety, Inc.* (Patent Owner), U.S. Patent and Trademark Office Before the Patent Trial and Appeal Board, Dec. 30, 2016, 49 pgs.
Parties' P.R. 4-3 Joint Claim Construction and Prehearing Statement with Exhibits A.1-E.2, District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5:14-cv-02591-ODW(DTBx), Nov. 23, 2015, 98 pgs.
Voxx's Preliminary Invalidity Contentions with Exhibits A-E, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-02591-ODW(DTBx), Sep. 28, 2015, 196 pgs.
Voxx International Corporation's, et al. Notice of Service of Amended Invalidity Contentions, United States District Court for the Central District of California, *Johnson Safety, Inc.* (Plaintiff) v. *Voxx International Corporation, Voxx Electronics Corporation, and Invision Automotive Systems, Inc.*, Jan. 20, 2017, 7 pgs.
Grumet Popular Mechanics, "Digital Dreams in Sin City," by Tobey Grumet, May 2000, 6 pgs. (pp. 96-104).
Popular Mechanics, "Desktop Theater", by Steve Ditlea, Oct. 1999, 3 pgs. (pp. 88-91).
PC Magazine, "PC Buyer's Guide", Dec. 3, 2002, 2 pgs.
PC Magazine, "How to Network your Home", Apr. 8, 2003, pp. 106-112.
Audiovox Corporation, LCM56, Owner's Manual, 2002, 12 pgs.
Audiovox, LCM-5600NP, 5.6" Active Matrix LCD Monitor, Owner's Manual, 2001, 8 pgs.
Audiovox Electronics Corp., LCM5869NP & LCM7069NP Remote Controlled Color Display Monitor, Installation and Owner's Manual, Mar. 27, 2002, 22 pgs.
Audiovox Electronics Corp., LCM5043NP & LCM5643NP Remote Controlled Color Display Monitor with Headphone Jack, Installation and Owner's Manual, Mar. 25, 2002, 20 pgs.
Audiovox, LCM-4000, 4" Active Matrix LCD Monitor, Owner's Manual, 2000, 8 pgs.
Audiovox Corporation, LCM-0565, 5.6" Active Matrix LCD Monitor, Owner's Manual, 2000, 8 pgs.
Audiovox Corporation, LCM-0505, 5" Active Matrix LCD Monitor, Owner's Manual, 2000, 8 pgs.
Audiovox Electronics Corp., LCM500NP 5 Inch Monitor with 2 Video Input Capability, Installation and Operation Manual, 2001, 16 pgs.

\* cited by examiner

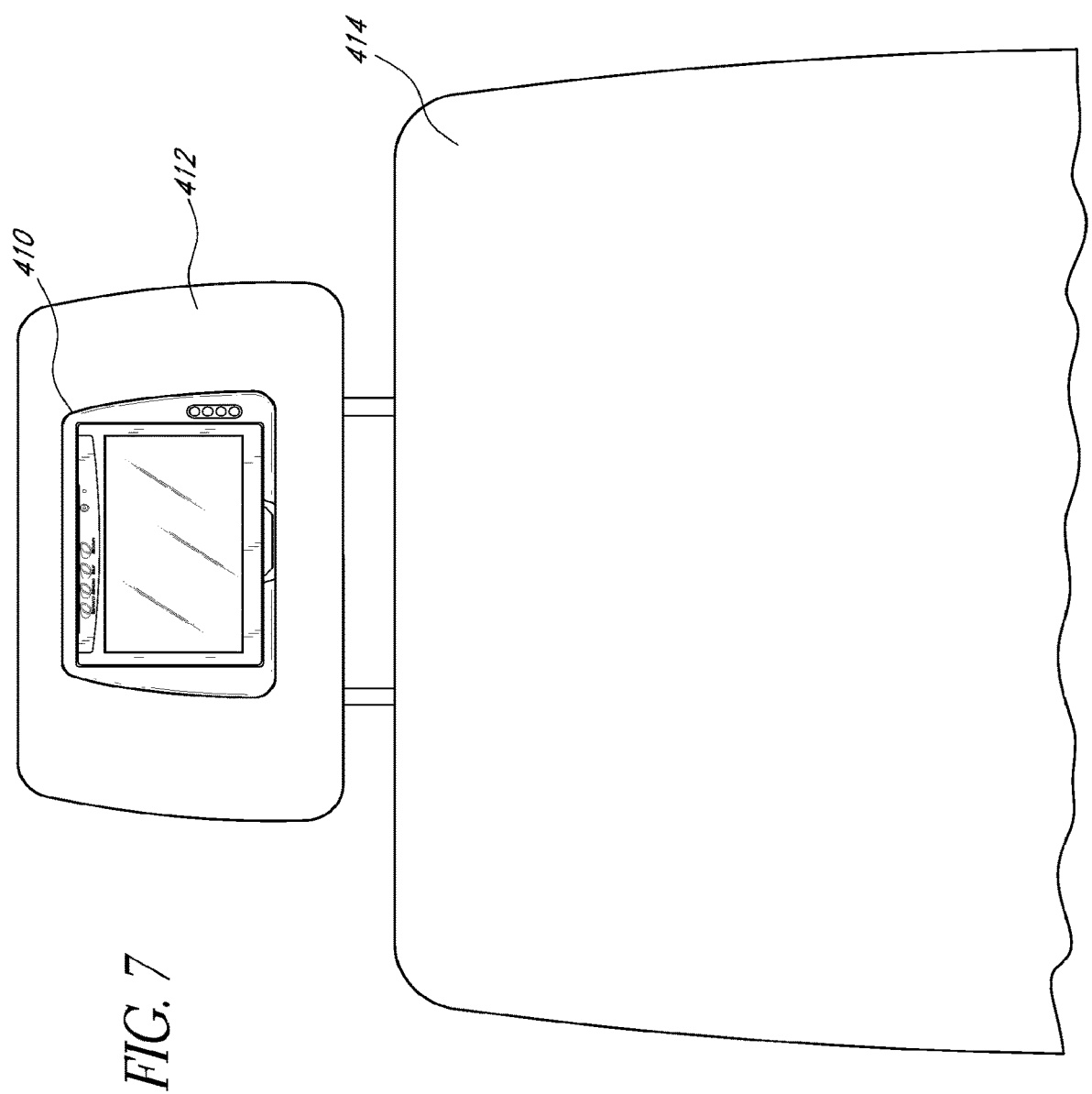

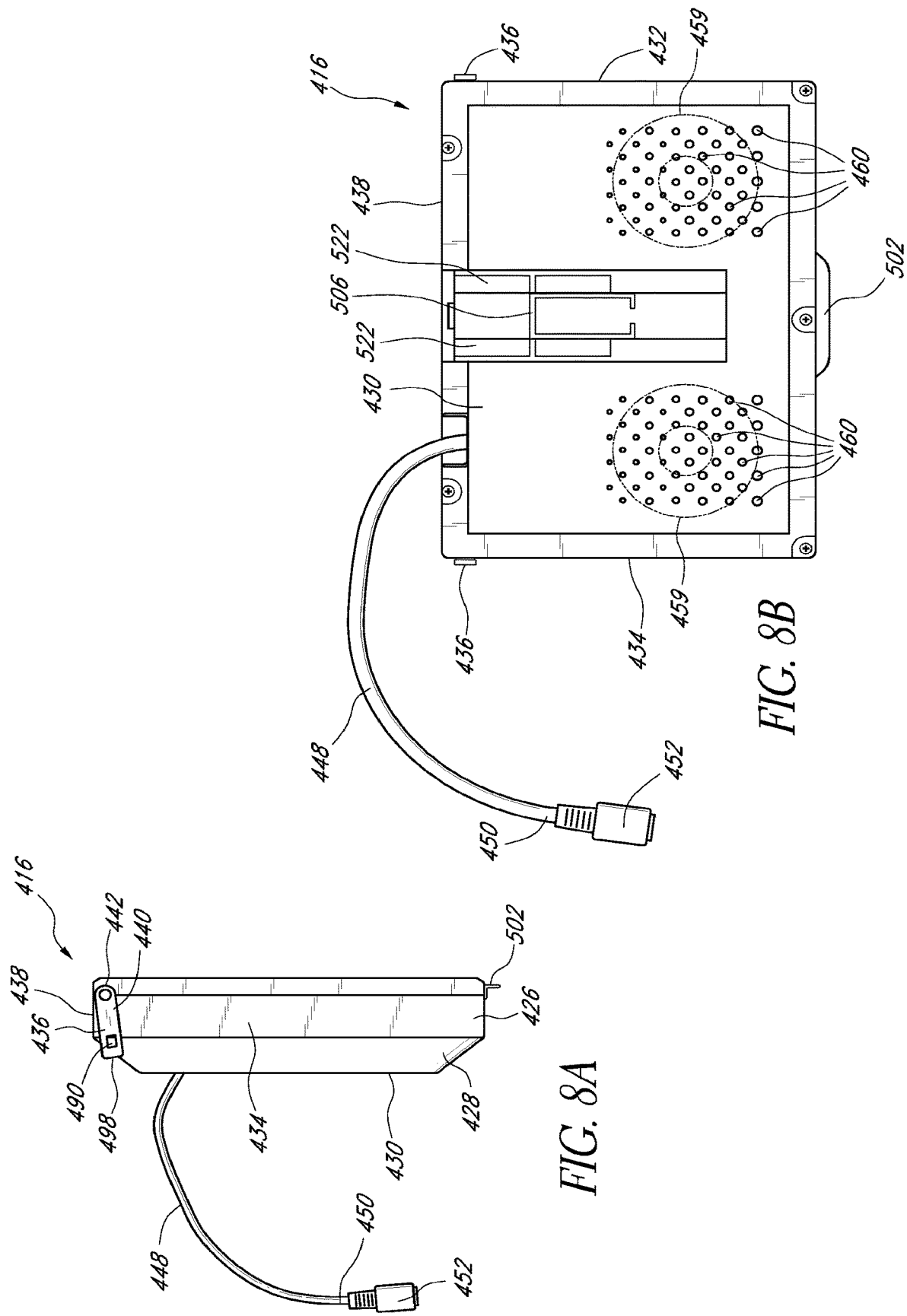

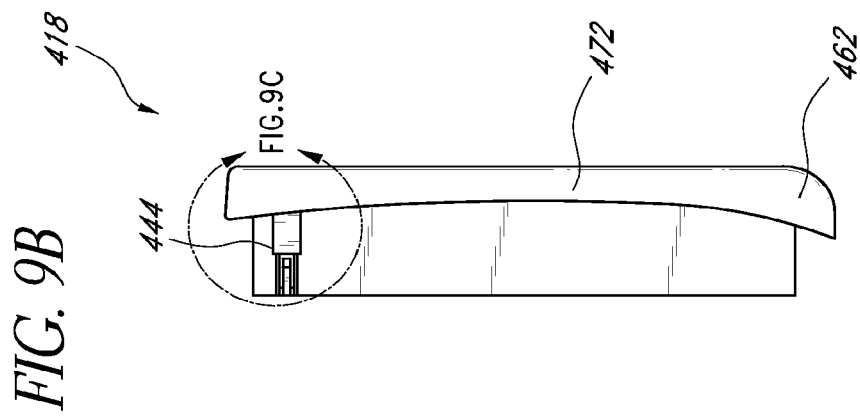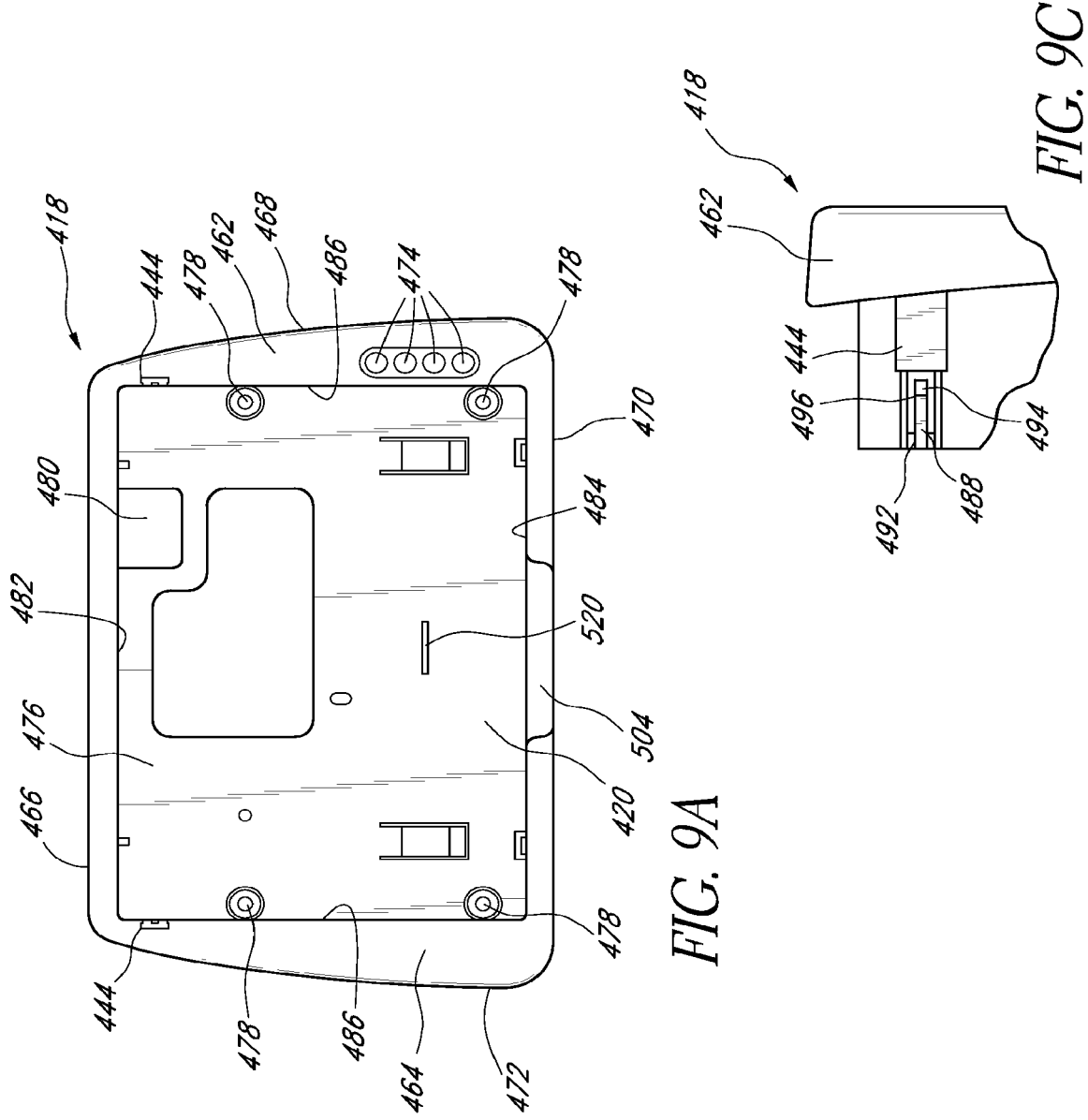

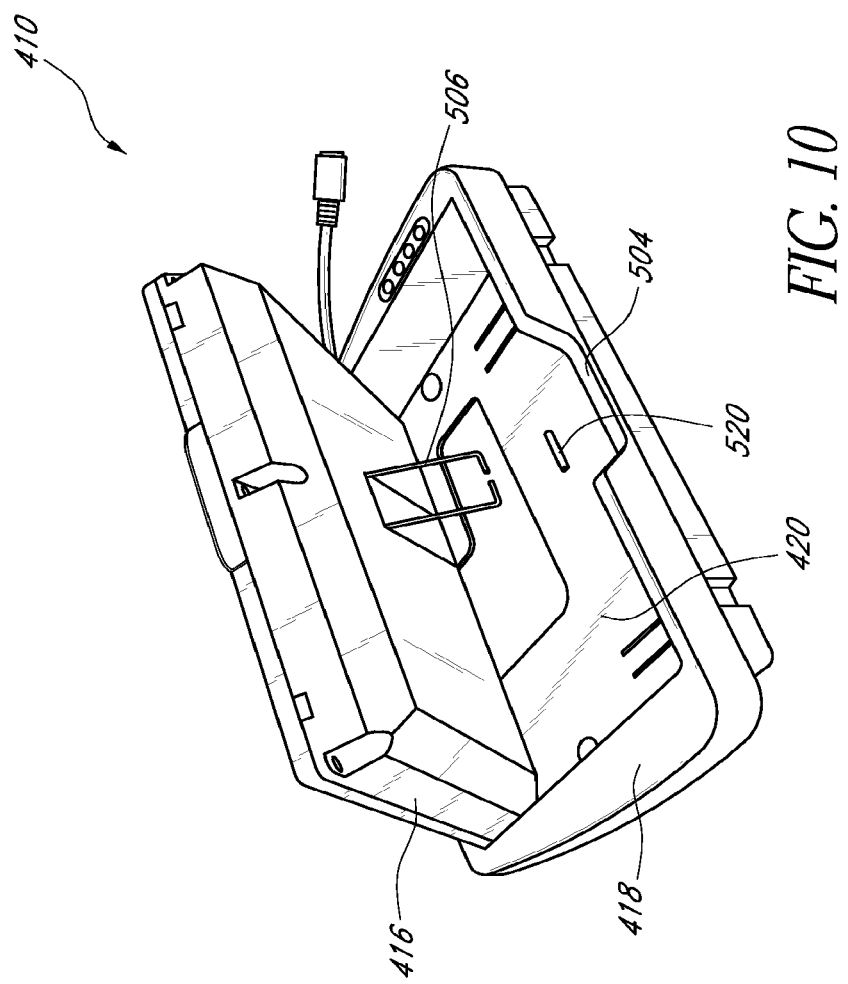

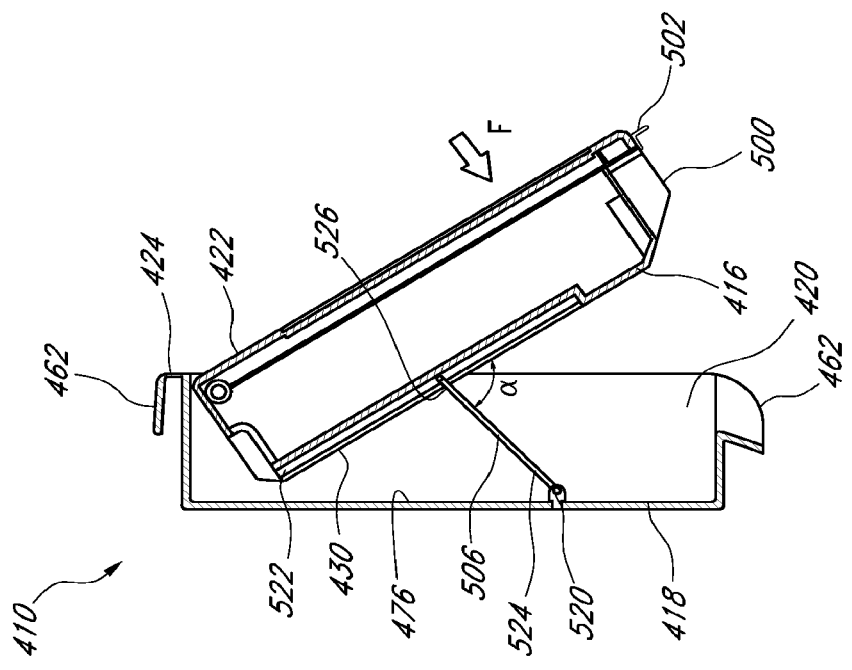
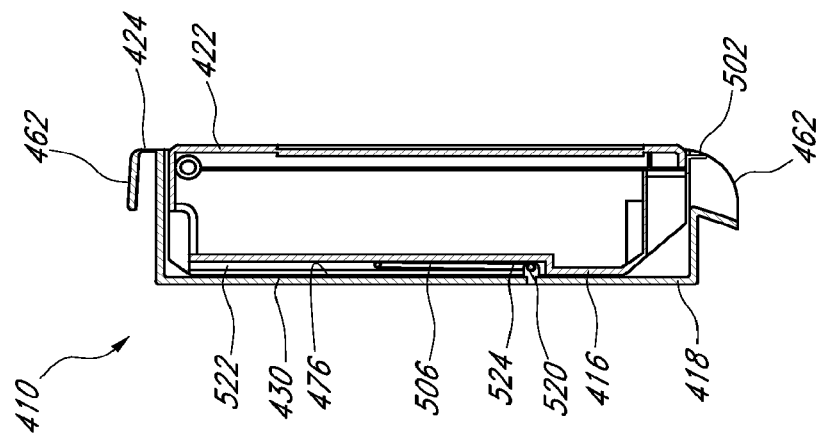

MOBILE VIDEO SYSTEM

RELATED APPLICATIONS

Any and all applications for which a foreign or domestic priority claim is identified in the Application Data Sheet as filed with the present application, are hereby incorporated by reference under 37 CFR 1.57. This application is a continuation of U.S. patent application Ser. No. 13/858,695, filed Apr. 8, 2013, which is a continuation of Ser. No. 12/614,364, filed Nov. 6, 2009, which is a continuation of U.S. patent application Ser. No. 10/985,262, filed Nov. 10, 2004, now U.S. Pat. No. 7,636,930 which is a continuation of U.S. patent application Ser. No. 10/361,897, filed Feb. 7, 2003, now U.S. Pat. No. 6,871,356, which claims the benefit of U.S. Provisional Patent Application No. 60/435,810, filed Dec. 20, 2002, and which also claims the benefit of U.S. Provisional Patent Application Ser. No. 60/421,936, filed Oct. 28, 2002, the entire contents of all of which are hereby expressly incorporated by reference.

BACKGROUND OF THE DISCLOSURE

Field of the Disclosure

This application relates to a mobile video system having more than one audiovisual source and more than one video monitor. More specifically, a mobile video system is provided that includes a wireless transmitter that transmits an audio portion of an audiovisual signal from an audiovisual source to a receiver, which may be a car radio.

Description of the Related Art

Audiovisual systems for vehicles have been commonplace aboard commercial aircraft and motor coaches for quite some time. Such systems have also been incorporated into automobiles. For example, U.S. Pat. No. 6,339,455 to Allan et al. discloses a digital video disc vehicle television mounted to the ceiling of an automobile. Similarly, U.S. Pat. No. 5,775,762 to Vitito discloses an overhead console having a flip-down monitor, where the console is mounted to the ceiling of an automobile.

The systems disclosed in U.S. Pat. Nos. 6,339,455 and 5,775,762, provide a TV monitor that is mounted to the ceiling of the automobile. Several passengers can watch the same program on the monitor simultaneously. While suitable for simultaneous viewing, passengers often have varying taste in entertainment and might, therefore, prefer to watch different programs. These systems, unfortunately, do not allow different passengers to select programming that suits them. This is a significant draw-back for one of the primary applications of such systems: occupying children during long road-trips. Children of different ages require different sorts of programming to maintain their interests. Accordingly, a child will not be distracted by programming that is not tailored to him or her.

Some of the systems designed for aircraft provide a unit associated with each seat (i.e., a viewer unit) that allow each passenger to select among a range of programs. However, hardwire connections are required between a device that transmits the programs (i.e., a program device) and the viewer unit. Thus, these systems require extensive wiring to interconnect the program device and the viewer unit. Moreover, because the systems require extensive wiring, as a practical matter, they can only be installed during manufacturing and cannot easily be after-market installed. Also, these systems generally only enable private listening of programs via headphones. While aircraft sometimes have overhead loudspeakers, these loudspeakers are generally not used for programs, but rather are reserved for announcements, e.g., safety instruction, arrival information, and customs procedures. Thus these systems relay the audio signal of the programs to passengers in only one way, through headphones.

SUMMARY OF THE DISCLOSURE

In one embodiment, A mobile video system in a motorized land vehicle having a passenger compartment and a seat having a headrest, the seat positioned in the passenger compartment is disclosed. The mobile video system includes: a radio that is installed in the vehicle and that includes a loudspeaker configured to output a signal received by the radio; at least one video source that generates an audiovisual signal; and a video monitor configured to receive a video portion of the audiovisual signal.

The video monitor includes: a housing sized and shaped to be substantially positioned within the headrest, the housing comprising a first hinge portion and defining a storage cavity; a screen structure sized and shaped to be substantially positioned within the storage cavity, the screen structure comprising a second hinge portion configured to cooperate with the first hinge portion to pivotably secure the screen structure to the housing; a first transmitter configured to transmit an audio portion of the audiovisual signal to a first receiver, wherein the first receiver is the radio; and a second transmitter configured to transmit the audio portion of the audiovisual signal to a second receiver, wherein adjusting the radio from outputting the audio portion of the audiovisual signal to outputting a broadcast radio station signal does not modify the transmission from the second transmitter to the second receiver.

BRIEF DESCRIPTION OF THE DRAWINGS

These and other features, aspects and advantages of the present invention will be better understood with reference a preferred embodiment, which is illustrated in the accompanying drawings. The illustrated embodiment is merely exemplary and is not intended to define the outer limits of the scope of the present invention. The drawings of the illustrated arrangement comprise six figures.

FIG. 7 is a front elevation view of one embodiment of a headrest-mounted monitor, illustrating the monitor installed in a headrest of a vehicle seat;

FIG. 8A is a left side elevation view of the screen structure of the headrest-mounted monitor of FIG. 7;

FIG. 8B is a rear elevation view of the screen structure of FIG. 8A;

FIG. 9A is a front elevation view of the housing of the headrest-mounted monitor of FIG. 7;

FIG. 9B is a left side elevation view of the housing of FIG. 9A;

FIG. 9C is a detail view of the second hinge portion of the housing of FIG. 9A;

FIG. 10 is a perspective view of the headrest-mounted monitor of FIG. 7, illustrating the screen structure pivoted outward from the housing;

FIG. 11A is a left side section view of the headrest-mounted monitor of FIG. 7, illustrating the screen structure in a storage position;

FIG. 11B is a left side section view of the headrest-mounted monitor of FIG. 7, illustrating the screen structure pivoted outward from the housing;

DETAILED DESCRIPTION OF THE PREFERRED EMBODIMENT

Figure 1:
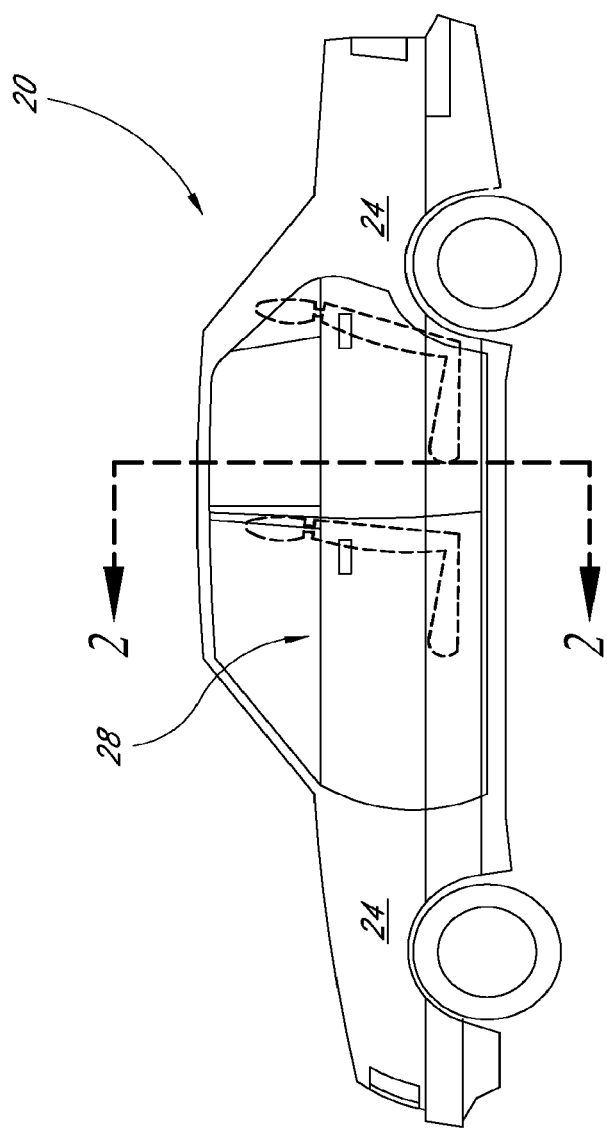
FIG. 1 is a side elevation view of a car arranged and configured in accordance with certain features, aspects and advantages of the present invention.
Figure 2:
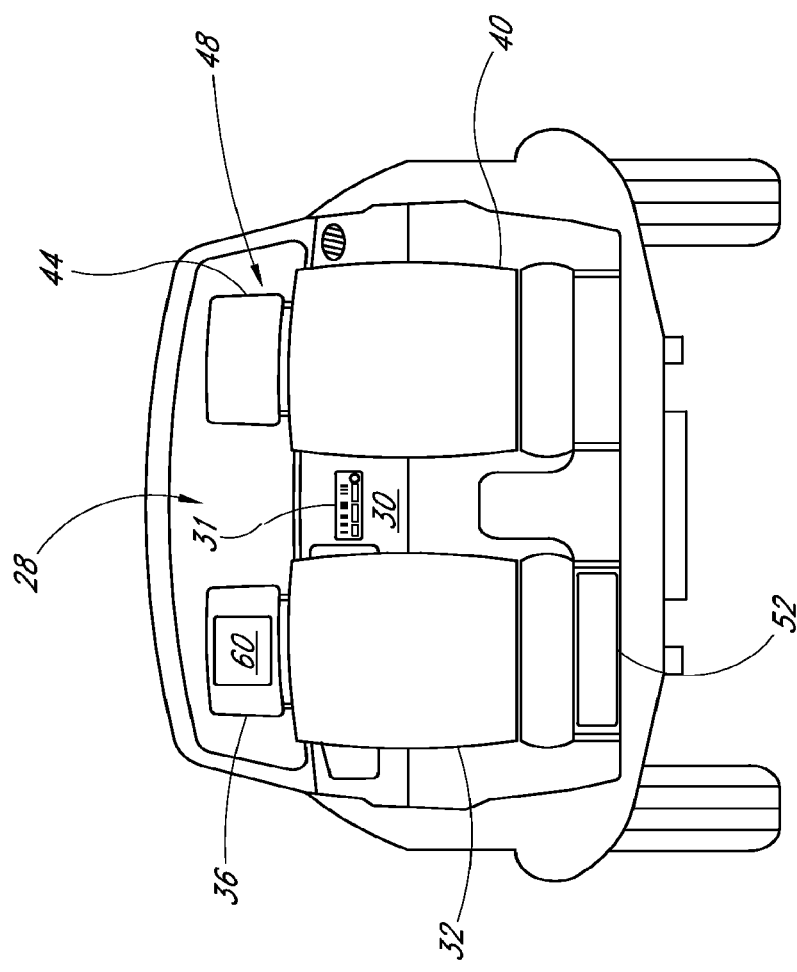
FIG. 2 is a cross sectional view of the car of FIG. 1.

With reference now to FIGS. 1 and 2, a car featuring certain features, aspects and advantages of the present invention will be described. The car, indicated generally by the reference numeral 20, is an environment for which many features, aspects and advantages of the embodiments described herein have been specially adapted. As used herein "car" is a broad term and is used in its ordinary sense and refers, without limitation, to any personal land transportation vehicle, e.g., a passenger automobile, a truck, a van, a mini-van, a sport-utility vehicle, etc. Nevertheless, certain features, aspects and advantages of the embodiments described herein can be used with other vehicles.

The car 20 generally comprises a chassis (not shown) to which a body having a plurality of body panels 24 is attached. A passenger compartment 28 is defined by the body. A dashboard 30 preferably is positioned within the passenger compartment 28. The dashboard 30 usually is coupled with the chassis of the car 20 and houses several components of the car 20, e.g., a car radio 31. A first front seat 32 that includes a first headrest 36 is positioned within the passenger compartment 28. Preferably a second front seat 40 that includes a second headrest 44 is also positioned within the passenger compartment 28. One skilled in the art will appreciate that the headrests 36, 44 need not take any particular form. For example, in one embodiment, at least one of the headrests 36, 44 is detachably attached to the corresponding front seat 32, 40. In another embodiment, at least one of the headrests 36, 44 is integrally formed with the corresponding front seat 32, 40. In other words, the headrests 36, 44 can take many forms, generally providing the function of supporting a head of a passenger sitting in the front seats 32, 40. In some embodiments, the size of at least one of the headrests 36, 44 must be sufficient to house a video monitor, as discussed in more detail below.

Figure 3:
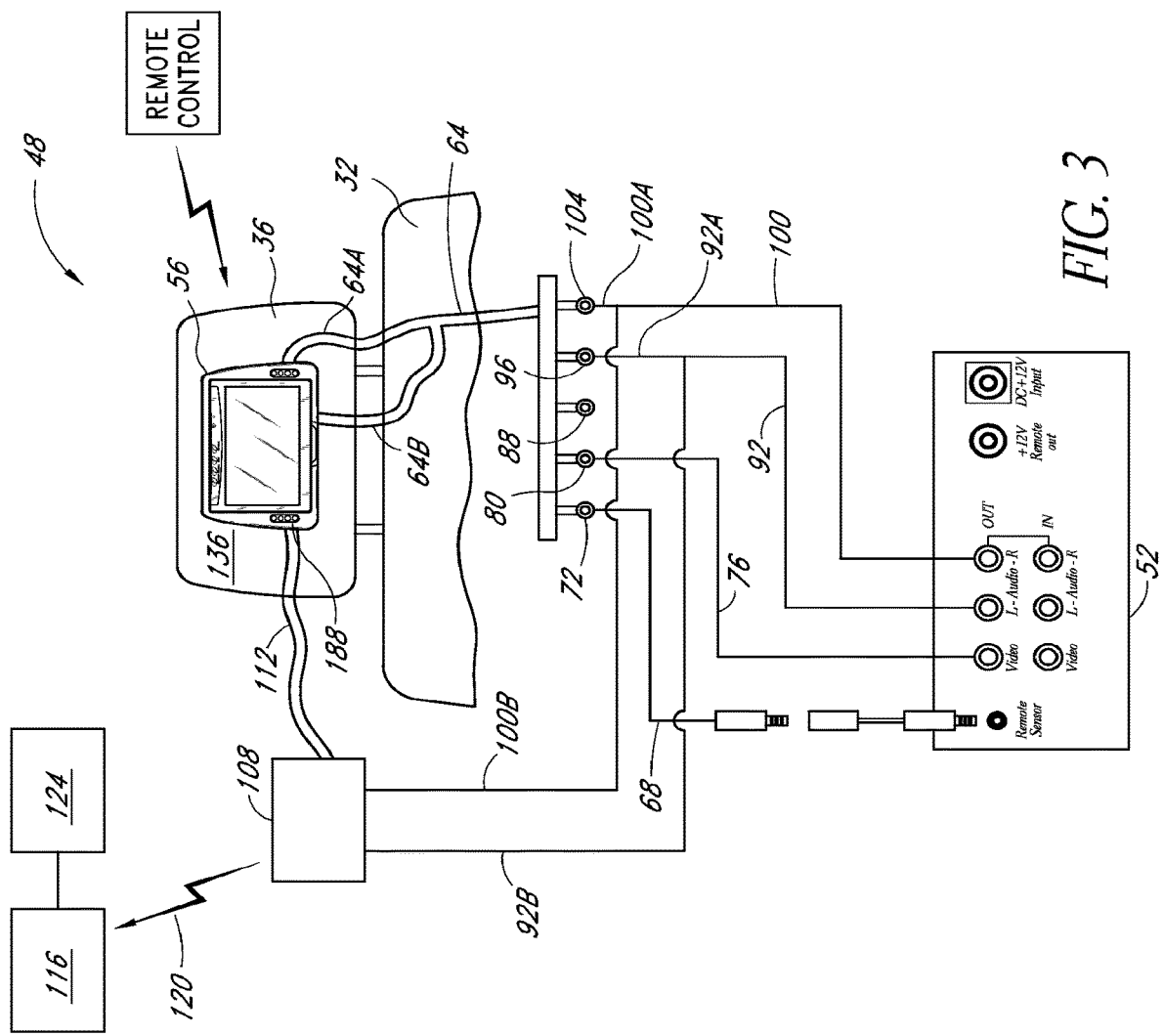
FIG. 3 is a schematic view of one embodiment of a mobile video system having a video monitor mounted in a headrest of a vehicle seat.
Figure 4:
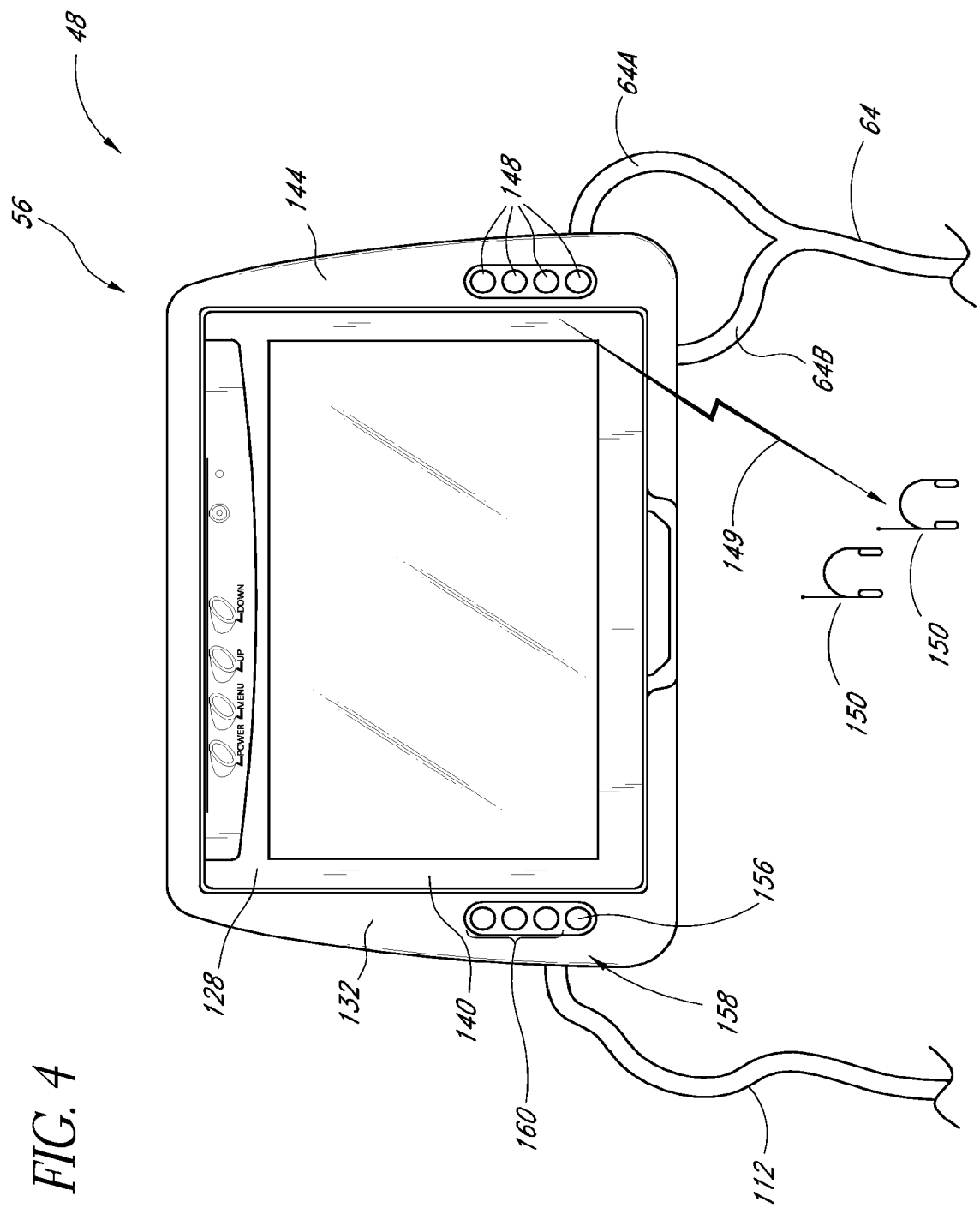
FIG. 4 is schematic view of the embodiment of FIG. 3, showing more details of the video monitor.

FIGS. 2-4 show one embodiment of a mobile video system 48 that preferably is positioned in the car 20. The mobile video system 48 preferably includes a video source 52, a video monitor 56 and the radio 31. As discussed in more detail below, the mobile video system 48 provides wireless transmission of an audio portion of an audiovisual signal and a manually operated audio frequency selector, or manual actuator, that selects a wireless transmission frequency.

The video source 52 is also referred to herein as an "audiovisual source." The terms "video source" and "audiovisual source" are broad terms that are used in their ordinary sense and refer, without limitation, to any device that generates an audiovisual signal that includes a video portion that can be processed to produce a video signal (e.g., to produce a visual image) and an audio portion that can be processed to produce an audio signal (e.g., sound at a level high enough to be heard by a human ear). For example, "video source" and "audiovisual source" are broad enough to cover a digital video-disc player, a video cassette player, a video-game console, and a computer that can generate audiovisual signals, etc. Thus, the video source 52 is described herein as generating or providing an audiovisual signal.

Video sources typically have a variety of jacks for interconnecting the sources with other components. For example, the sources may have output jacks to convey the audio portion of an audiovisual signal and may have output jacks to convey the video portion of an audiovisual signal. Video sources may also have output jacks to convey to other devices power or control signals, e.g., remote control signals. Video sources also may have input jacks to receive from other sources power, control signals, or other audiovisual signals.

The video source 52 advantageously can be positioned in a wide variety of locations in the car 20. In some embodiments, the video source 52 is preferably positioned within the passenger compartment 28 so as to be accessible while the car 20 is in motion. For example, the video source 52 is shown positioned beneath the front seat 32 in the embodiment illustrated by FIG. 2. In other embodiments, the video source 52 is positioned in the dashboard 30. It may be advantageous to position the video source 52 in a more secure location, such as in a storage compartment that is not accessible from the passenger compartment 28 (e.g., the trunk). Alternatively, in some cars, there may be sufficient overhead space in the passenger compartment 28 for the source 52 to be mounted overhead. One skilled in the art will appreciate that the source 52 could be housed in an overhead console (not shown). In some embodiments, more than one video source is provided. Such embodiments are discussed in connection with FIGS. 5 and 6.

The mobile video system 48 preferably also includes a set of input jacks 60. As discussed more fully below, a first audiovisual signal line 64 having an audio branch 64A and a video branch 64B interconnects the input jacks 60 and the video monitor 56. In one embodiment, the first video source 52 connects to the set of input jacks 60 through a series of signal lines. For example, a remote sensor signal line 68 that is connected to the first video source 52 is received by a first remote sensor jack 72. Preferably, a video signal line 76 interconnects the video source 52 and a primary video signal jack 80. In the illustrated embodiment, a secondary video signal jack 88 is provided which can receive a signal line connected to a second video source. A left-side audio signal line 92 has a first branch 92A and a second branch 92B. The first branch 92A of the left-side audio signal line 92 interconnects the video source 52 and a left-side audio signal jack 96. A right-side audio signal line 100 has a first branch 100A and a second branch 100B. The first branch 100A of the right-side audio signal line 100 interconnects the first video source 52 and a right-side audio signal jack 104.

As discussed above, the mobile video system 48 provides wireless transmission of audio signals. Preferably the mobile video system 48 includes at least one wireless transmitter. In one embodiment a primary wireless transmitter 108 is provided that is coupled with the video monitor 56 via a signal line 112. As is discussed more fully below, the signal line 112 may be capable of conveying at least one input command from a passenger that may include directing the transmitter 108 to switch from one frequency to another frequency. In the illustrated embodiment, the primary wireless transmitter 108 and the video source 52 also are connected via the audio signal lines 92, 100. In particular, the second branch 92B of the left-side audio signal line 92 interconnects the video source 52 and the primary wireless transmitter 108 and the second branch 100B of the right-side audio signal line 100 interconnects the video source 52 and the primary wireless transmitter 108. Other embodiments with a single connection between the primary wireless transmitter 108 and the video source 52 can also be provided.

Wireless transmission in the mobile video system 48 is indicated by the arrow 120. Wireless transmission of the audio signals advantageously eliminates the need for extensive installation of wiring in the car 20 to physically connect the source 52 and the radio 31. This is particularly advantageous for after-market installation of the mobile video system 48. The primary wireless transmitter 108 preferably can employ any radio frequency transmission method that is compatible with the receiver 116, e.g., amplitude modulation transmission, short-wave transmission, etc. In one embodiment, the primary wireless transmitter 108 comprises a frequency modulation (FM) transmitter that transmits audio signals in a wireless manner to at least one audio signal receiver 116. FM transmission is particularly advantageous because it produces higher quality sound reproduction than other transmission techniques, e.g., amplitude modulation transmission.

The audio signal receiver 116 is a factory or a permanently installed radio in one embodiment, e.g. the car radio 31, and is a portable radio within the vehicle in another embodiment. In one embodiment, the audio signal receiver 116 provides audio signals to at least one loudspeaker, or speaker 124 to be audibly reproduced for one or more passengers in the car 20. Thus, a group of listeners can enjoy the audio signals generated by the audiovisual source 52. In another embodiment, the at least one audio signal receiver 116 comprises two sets of headphones that include speakers for private listening by a single passenger. As discussed more fully below, at least one set of headphones can also be provided to receive audio signals from a secondary audio signal transmitter.

One embodiment of the video monitor 56 is shown in more detail in FIG. 4. The embodiment illustrated in FIG. 4 is particularly suited for mounting in a headrest of a vehicle seat. In other embodiments, the video monitor 56 can be configured to be suspended from the ceiling of the vehicle. Details of the construction of such a system are set forth in U.S. Pat. No. 6,409,242, the entire contents of which is hereby expressly incorporated herein and made a part of this specification. The video monitor 56 illustrated in FIG. 4 includes a screen structure 128 that is pivotally attached to a housing 132. Both the housing 132 and an outer casing of the screen structure 128 are preferably constructed of a high-strength plastic, so that the video monitor 56 is light-weight and durable. The housing 132 is configured to be embedded in a headrest, e.g., the independently moveable headrest 36. In particular, the housing 132 is embedded in a rear-facing surface 136 of the headrest 36 (See FIG. 3). The housing 132 preferably defines a cavity that receives the screen structure 128. The cavity is substantially the same size and shape as the screen structure 128, such that when the screen structure 128 is stored, a front face 140 of the screen structure 128 is substantially flush with an outer surface 144 of the housing 132, which is in turn substantially flush with the rear-facing surface 136 of the headrest 36. The video monitor 56 thus preferably protrudes only minimally or not at all from the headrest 36.

The video monitor 56 may be adapted to be adjustably mounted to the headrest 36. For example, in one embodiment, an angular orientation of the video monitor 56 relative to the headrest 36 is adjustable without moving the headrest 36. More details various embodiments of a video monitor 56 that is configured to be mounted to a headrest are set forth herein in connection with FIGS. 7-13B, and may be found in U.S. application Ser. No. 10/219,987, filed Aug. 13, 2002, which is hereby expressly incorporated by reference herein in its entirety and made a part of this specification.

In one embodiment, the video monitor 56 also includes a secondary wireless transmitter 148. Preferably, the secondary wireless transmitter 148 transmits an audio portion of an audiovisual signal to at least one secondary receiver 150. In the embodiment illustrated in FIG. 4, the at least one secondary receiver 150 comprises two sets of headphones. Thus, in this embodiment, the at least one secondary receiver 150 comprises two personal speaker systems. The secondary wireless transmitter 148 advantageously transmits the audio portion of an audiovisual signal. Arrows 149 indicate that the transmission from the transmitter 148 to the at least one secondary receiver 150 is wireless. The transmitter 148 can operate on any desirable frequency range. In one embodiment, the secondary wireless transmitter 148 is an FM transmitter. FM transmitters advantageously do not require a line-of-sight connection between the secondary wireless transmitter 148 and the secondary receiver 150. In another embodiment, the secondary wireless transmitter 148 comprises an infrared transmitter. Infrared audio signal transmitters advantageously do not transmit in a band that can be received by the radio 31 and therefore they will not interfere with reception by the radio 31. One type of infrared transmitter that can be used comprises four light emitting diodes (LEDs). In one embodiment the infrared transmitter 148 operates at about 2.3 MHz or at about 2.8 MHz. In another embodiment the infrared audio signal transmitter 148 operates at about 3.2 MHz or at about 3.8 MHz. In one embodiment, the transmitter 148 transmits audio signals in stereo at 2.3 MHz, at 2.8 MHz, or at both 2.3 MHz and 2.8 MHz. One skilled in the art will recognize that other frequencies could also be used for such transmissions. By including the secondary wireless transmitter 148 and the receiver 150, one or more passengers can enjoy a movie or a video game while other passengers listen to the same movie or video game on the radio 31. This enables the passenger listening on the headphones to not be disturbed if other passengers listening on the radio 31 choose to listen to a broadcast radio station.

Because many environments in which the mobile video system 48 will be used receive broadcasts at many radio frequencies, interference between these prevailing radio signals and those generated by the primary wireless transmitter 108 sometimes will occur. This interference can render the audio signal unlistenable. Thus, the mobile video system 48 advantageously includes a manually operated audio frequency selector, or manual actuator 156. The manual actuator 156 selects a transmission frequency upon which the primary wireless transmitter 108 transmits the audio portion of an audiovisual signal. In one embodiment, the manual actuator 156 comprises a push-button that is wired to the primary wireless transmitter 108 and that is operable by a passenger within the car 20. In one embodiment, the manual actuator 156 also provides an on/off signal to the video monitor 56.

Preferably, the manual actuator 156 is at least partially positioned within the housing 132 for the video monitor 56. In one embodiment, the manual actuator 156 is provided in a cluster of manual controls 158 located on the housing 132. By positioning the manual actuator 156 within the housing 132 for the video monitor 56, the number of components that need to be separately installed is reduced, which also reduces installation cost and complexity. In another embodiment, the manual actuator 156 comprises a remote control device. The remote control manual actuator 156 advantageously allows passengers sitting in a variety of seats throughout the vehicle to move the frequency of transmission as needed. As will be understood by one skilled in the art, a remote control device can be a self-contained device that can be moved around within the passenger compartment 28, or can be a control panel affixed to a location within the passenger compartment, but remotely located from the video monitor 56.

Preferably the mobile video system 48 also includes an audio frequency indicator 160 that provides a visual signal regarding the frequency of transmission selected by the manual actuator 156. For example, as shown in FIG. 4, the audio frequency indicator 160 comprises a plurality of LEDs that are energized to indicate the frequency of transmission selected by the manual actuator 156. The audio frequency indicator 160 informs at least one passenger which frequency is being used by the primary wireless transmitter 108 and, therefore, which frequency to tune the audio receiver 116 to in order to receive the audio transmission. The audio frequency indicator 160 thus enables the passenger to very quickly tune the receiver 116 to the indicated frequency.

In one embodiment, the audio frequency indicator 160 is positioned within the housing 132 of the video monitor 56, e.g., as one portion of the manual controls 158. By positioning the audio frequency indicator 160 in the housing 132, the indicator 160 is desirably visible to the passengers who are able to view the monitor so that the audio signal receiver 116 can be tuned to the selected frequency. Also, by positioning the audio frequency indicator 160 in the housing 132, the number of components to be separately installed is reduced, as is the cost of the installation. Of course, the audio frequency indicator 160 could be located elsewhere, so long it can be conveniently read by a passenger. For example, it may be advantageous in some embodiments to position the audio frequency indicator 160 near the radio 31 so that a passenger in the front seat near the radio 31 can switch the radio 31 to the selected frequency. In another embodiment, the audio frequency indicator 160 is positioned on a remote control device, e.g., a remote control audio frequency selector. Providing the audio frequency indicator 160 on a remote control device advantageously reduces installation cost where the remote control is not connected to the passenger compartment 28. Also, where the remote control device is not connected to the passenger compartment 28, any passenger seated anywhere in the vehicle can see the audio frequency indicator 160. In another embodiment, the audio frequency indicator 160 is located in a separate housing that is located within the passenger compartment 28, e.g., near the radio 31.

In one embodiment, the manual actuator 156 is a power/select button that switches the mobile video system 48 on and off if held in for an extended time. However, once the mobile video system 48 is turned on, brief actuation of the manual actuator 156 causes the frequency of transmission of the primary wireless transmitter 108 to be altered. In one embodiment, the brief actuation of the manual actuator 156 causes a signal to be conveyed to the wireless transmitter 108 via the signal line 112.

The manual actuator 156 and the audio frequency indicator 160, where used together, provide great advantages to the mobile video system 48. For example, these components enable a passenger to sense the degrading quality of audio signal reception at the receiver 116. This degrading quality can cause some or all of the audio signal to be obscured. Thus, as the signal degrades, the passenger can manually actuate the actuator 156, thus causing the frequency of transmission to be altered. In one embodiment, three preset transmission frequencies are provided. The passenger manually actuates the actuator 156 to move the frequency of transmission from one of the three preset frequencies to another of the preset frequencies. The audio frequency indicator 160 indicates which frequency has been thereby selected and indicates, therefore, to which frequency the passenger should tune the receive 116. Thus, three known frequencies are provided to which the receiver 116 can be tuned.

This arrangement advantageously enables the passengers to move from a frequency to another frequency preemptively. On a familiar drive (e.g., a daily commute), a passenger may become aware of a first area where, at a first frequency band, interference causes the audio signal to become obscured, i.e., degrades the audio signal from listenable to unlistenable. The passenger may also know that at a second frequency band interference is not present when the car is in the first area, and therefore the audio signal would not become obscured. A little farther along the drive, the car might enter a second area known by the passenger to be subject to interference at the second frequency band. The passenger may also know that at a third frequency band, interference is not present in the second area. Accordingly, the prior to entering the first area, the transmitter 108 may be set to transmit to the receiver 116 at the first preset frequency band. Because the passenger is aware of the impending interference in the second area, the passenger can actuate the manual actuator 156 just prior to entering the second area to cause the transmission frequency band to move from the first preset frequency band to the second preset frequency band. Also, the receiver 116 may have a button that automatically causes the receiver 116 to receive signals at the same second preset frequency band (e.g., a radio station preset buttons). Then, just prior to entering the second area, the passenger can again actuate the manual actuator 156 to cause the band of frequency transmission to move from the second preset frequency to the third preset frequency band. As discussed above, the receiver 116 can be automatically switched to the third preset frequency, e.g., using a radio station preset button. Thus, one advantage of the mobile video system 48 is that it enable passengers to preemptively switch transmission frequency of the transmitter 108 to prevent any substantial amount of audio signal loss during a familiar car trip. If the passenger had to turn a dial or in any other hunt for an available frequency, the passenger would either have to pause the playback of the audiovisual signal or completely miss a portion of the signal.

Figure 5:
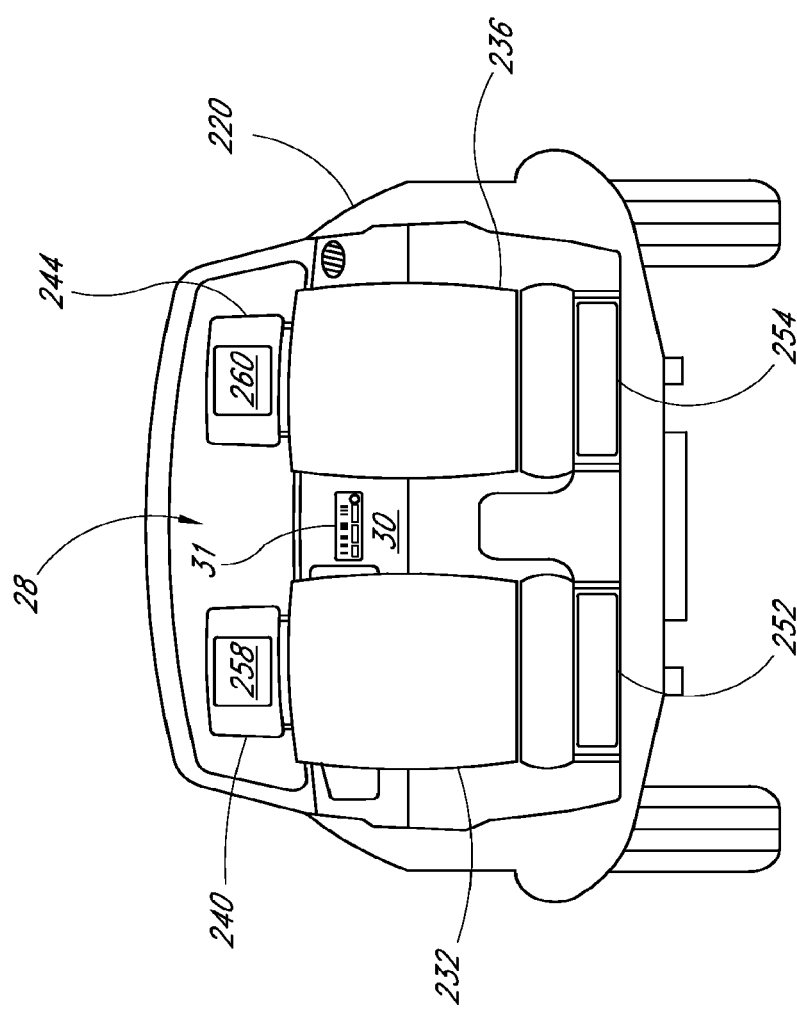
FIG. 5 is a cross-sectional view similar to that of FIG. 2, showing a car equipped with one embodiment of a dual-monitor mobile video system.
Figure 6:
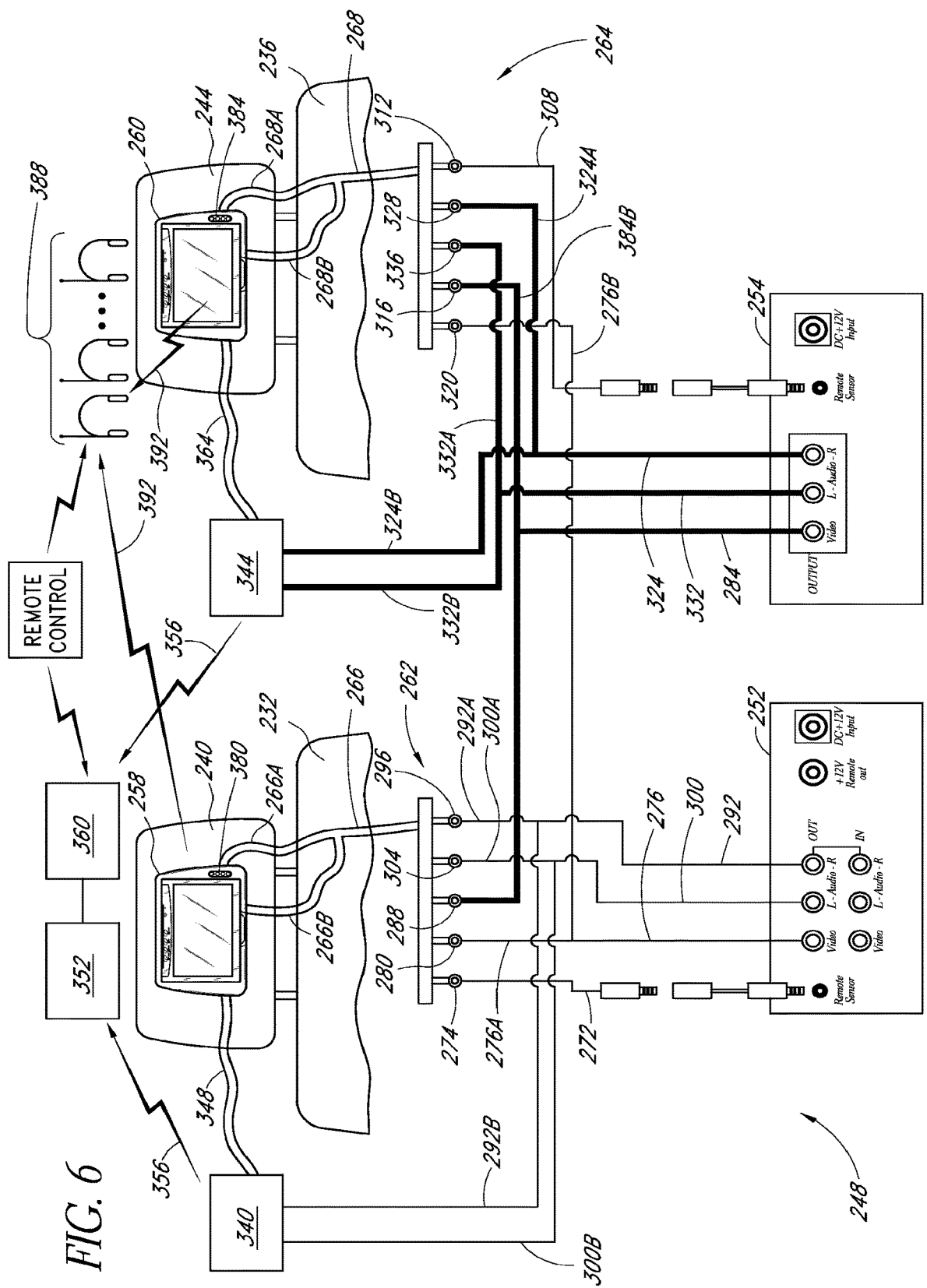
FIG. 6 is a schematic view of one embodiment of a dual monitor mobile video system.
Figure 7A:
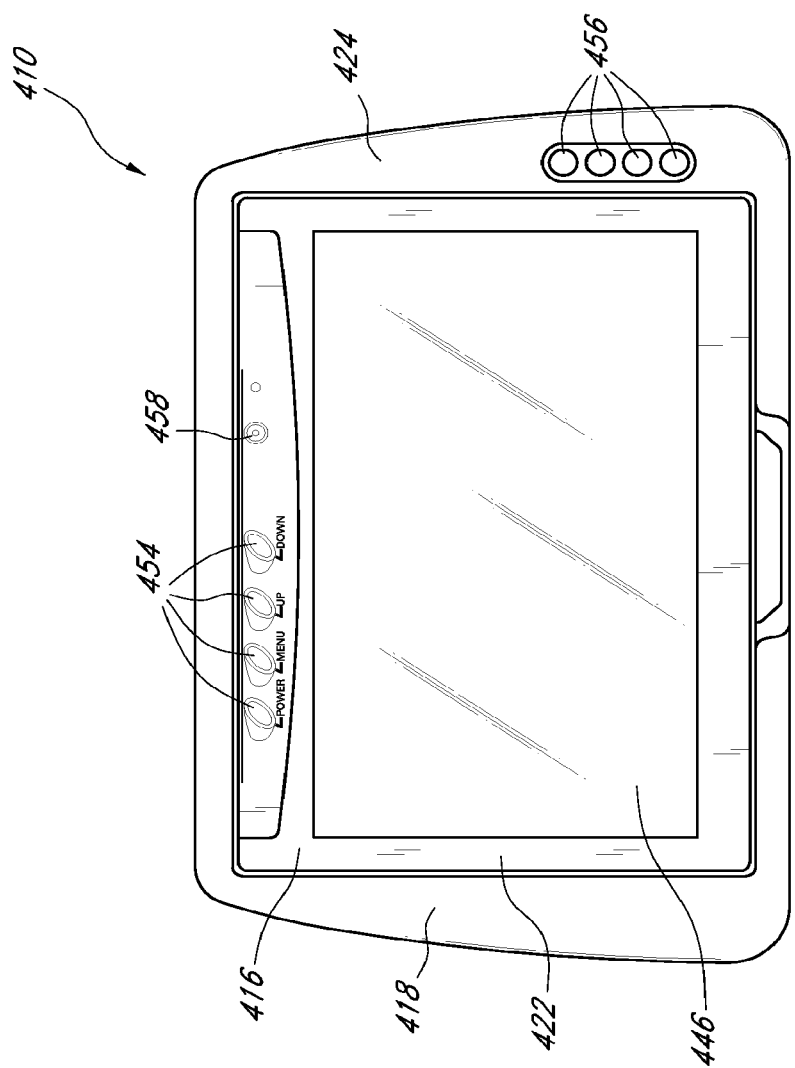
FIG. 7A is a front elevation view of the headrest-mounted monitor of FIG. 7.
Figure 12:
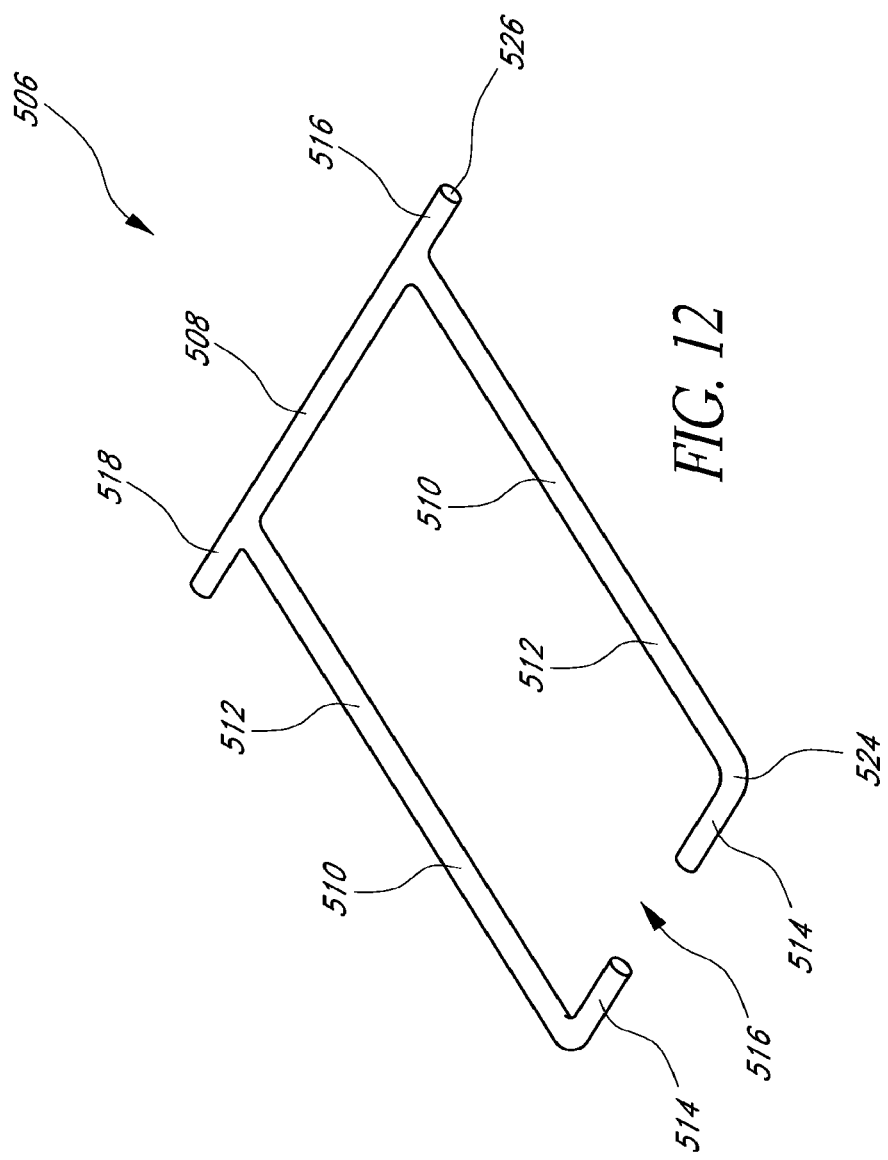
FIG. 12 is a perspective view of the bracket of the headrest-mounted monitor of FIG. 7.

Another embodiment is illustrated by FIGS. 5 and 6, wherein at least two video sources and two video monitors are provided. The system below is similar to that described above, and the details described above should be considered to supplement the discussion of the following embodiment.

Referring to FIG. 5, a car 220 includes a first seat 232 and a second seat 236. The first seat 232 comprises a first headrest 240 and the second seat comprises a second headrest 244. The car 220 also includes a mobile audiovisual system 248 that includes a first video source 252 and a second video source 254. The video sources 252, 254 are similar to the source 52 discussed above. Although this embodiment shows two sources, there can of course be more than two as well.

The mobile video system 248 preferably also includes a first set of input jacks 262, a second set of input jacks 264, a first video monitor 258, and a second video monitor 260. A first audiovisual signal line 266 that has an audio branch 266A and a video branch 266B is provided to interconnect the input jacks 262 and the first video monitor 258. A second audiovisual signal line 268 having an audio branch 268A and a video branch 268B is provided to interconnect the input jacks 264 and the second video monitor 260.

In one embodiment, the first video source 252 connects to the input jacks 262, 264 through a series of signal lines. For example, a remote sensor signal line 272 that is connected to the first video source 252 is received by a first remote sensor jack 274. Preferably, a first video signal line 276 is connected to the first video source 252. The first video signal line 276 includes a first branch 276A and a second branch 276B. The first branch 276A of the first video signal line 276 is received by a first primary video signal jack 280. A second video signal line 284 is connected to the second video source 254. The second video signal line 284 includes a first branch 284A and a second branch 284B. The first branch 284A is received by a first secondary video signal jack 288. A first right-side audio signal line 292 that is connected to the first video source 252 includes a first branch 292A and a second branch 292B. The first branch 292A of the first right-side audio signal line 292 is received by a first right-side audio signal jack 296. A first left-side audio signal line 300 that is connected to the first video source 252 includes a first branch 300A and a second branch 300B. The first branch 300A is received by a first left-side audio signal jack 304.

In one embodiment, the second video source 254 connects to the input jacks 262, 264 through a series of signal lines. For example, a remote sensor signal line 308 that is connected to the second video source 254 is received by a second remote sensor jack 312. Preferably, the second branch 284B of the second video signal line 284 is received by a second secondary video signal jack 316. The second branch 276B of the first video signal line 276 preferably is received by a second primary video signal jack 320. A second right-side audio signal line 324 that is connected to the second video source 254 includes a first branch 324A and a second branch 324B. The first branch 324A of the first right-side audio signal line 324 is received by a second right-side audio signal jack 328. A second left-side audio signal line 332 that is connected to the second video source 254 includes a first branch 332A and a second branch 332B. The first branch 328A is received by a second left-side audio signal jack 336.

The mobile video system 248 also advantageously includes a plurality of wireless transmitters. In one embodiment a first primary wireless transmitter 340 and a second primary wireless transmitter 344 are provided. In one embodiment, the second branch 292B of the first right-side audio signal line 292 is coupled with the first primary wireless transmitter 340. Preferably, the second branch 300B of the first left-side audio signal line 300 is coupled with the first primary wireless transmitter 340. In one embodiment, the first primary wireless transmitter 340 is also coupled with the first video monitor 258, e.g., via a signal line 348. Like the signal line 112, the signal line 348 may be capable of conveying at least one input command from a passenger that may include directing the transmitter to switch from one frequency to another frequency.

The second primary wireless transmitter 344 is similarly coupled with the second video source 254. In particular, the second branch 332B of the second left-side audio signal line 332 and the second branch 324B of the first right-side audio signal line 324 are coupled with the second primary wireless transmitter 344. In one embodiment, the second primary wireless transmitter 344 is also coupled with the second video monitor 260, e.g., via a signal line 364. As with the signal line 348, the signal line 364 may be capable of conveying at least one input command from the user.

The primary wireless transmitters 340, 344 are configured to transmit an audio portion of an audiovisual signal generated by the first source 252 and the second source 254 respectively in the manner described above. Thus, in one embodiment, the wireless transmitters 340, 344 transmit the audio portion of the audiovisual signals to at least one audio signal receiver 352. Wireless transmission is indicated by the arrow 356. As discussed above, in connection with the receiver 116, the receiver 352 preferably is connected to at least one loudspeaker 360.

In one embodiment, the first video monitor 258 includes a first secondary wireless transmitter 380 and the second video monitor 260 includes a second secondary wireless transmitter 384. The transmitters 380, 384 may operate in a fashion similar to the wireless transmitter 148, discussed above. Each of the first secondary wireless transmitter 380 and the second secondary wireless transmitter 384 can desirably transmit audio signals to one or more sets of headphones 388. The wireless transmission to the sets of headphones 388 is indicated by the arrows 392. As discussed above in connection with the transmitter 148, the transmitters 380, 384 can be an infrared transmitters, or any other suitable transmitter.

In addition to the advantages discussed above in connection with the audiovisual system 48, the audiovisual system 248 provides a great deal of flexibility in passenger entertainment. For example, the audiovisual system 248 advantageously allows one passenger to watch a movie generated by one of the audiovisual sources 252, 254 on one of the video monitors 258, 260, while another passenger watches a different movie generated by a different audiovisual source on the other of the video monitors 258, 260. Or, while one passenger watches a movie on one of the video monitors 258, 260, another passenger can play a video game using a different audiovisual source, with the video signal of the video game being displayed on the other of the video monitors 258, 260. Numerous combinations of audiovisual signals that can be flexibly displayed on the video monitors 258, 260 are possible. The audiovisual system 248 is also flexible in that audio signals can be conveyed thereby in the two modes (e.g., FM wireless and IR wireless, in one embodiment) as described above in connection with the audiovisual system 48.

The audiovisual system 248 allows one passenger to listen privately on headphones to a movie, a video game, or another audiovisual signal, while the other passengers listen together over the vehicle radio or other FM receiver to the audio signal of another movie, another video game, or another audiovisual source. By providing multiple headphones 388, two or more passengers can listen privately to the audio signal generated by one audiovisual source, while one or more other passengers listen collectively to the audio signal generated by another audiovisual source and provided to the speakers 360.

In the embodiment illustrated in FIG. 6, two primary wireless transmitters are provided that can communicate with the audio signal receiver 352, namely the first primary wireless transmitter 340 and the second primary wireless transmitter 344. In another embodiment, a mobile video system can be provided that includes two video sources and one primary wireless transmitter that is associated with only one of the two video source. In this embodiment, the source with which the primary wireless transmitter is associated will be the source used for group viewing. The other source will be capable of transmitting to headphones for private listening. Of course, the source associated with the primary wireless transmitter can also comprise a secondary wireless transmitter that transmits to headphones for private listening.

Advantageously, the audiovisual system 248 can provide flexible entertainment, as discussed above, without requiring a separate switching unit. Accordingly, the audiovisual system 248 costs less to manufacture and to install and also is easier to install.

FIG. 7 illustrates another embodiment of a monitor 410 disposed within a headrest 412. The headrest 412 is mounted to a vehicle seatback 414, and is movable independently of the seatback 414 toward and away from the seatback 414. The monitor 410 preferably faces a rear of the vehicle so that images displayed on the monitor 410 are visible to passengers seated behind the seatback 414. Features of the monitor 410, which are described in detail below, reduce the risk of injury to passengers presented by the monitor 410, and enable the monitor 410 to be mounted in the very limited space available within a typical vehicle headrest 412.

Figure 13B:
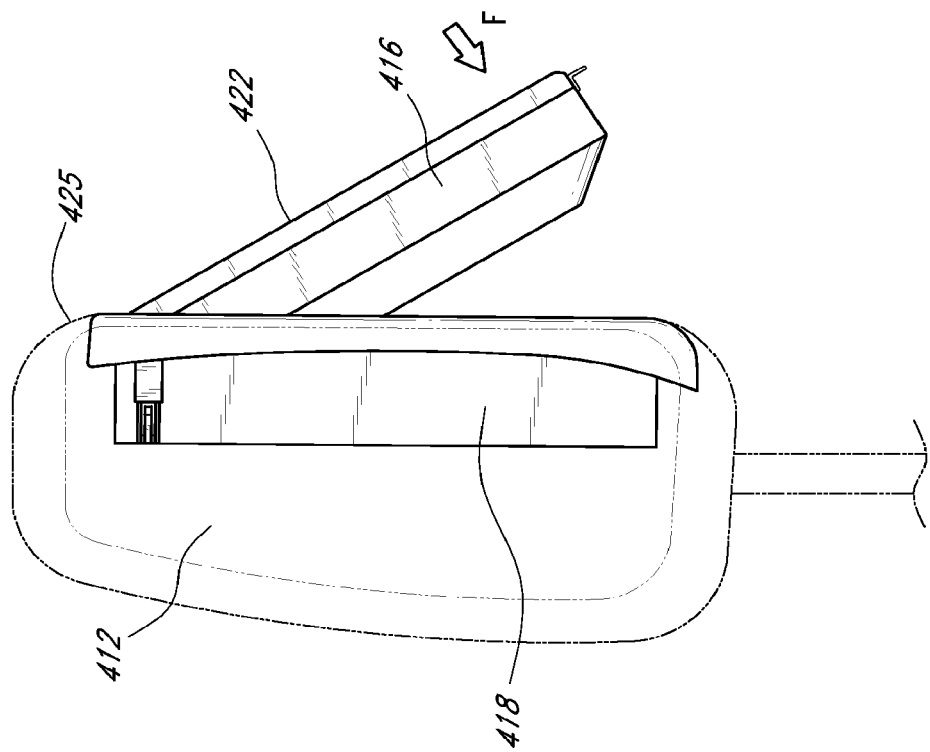
FIG. 13B is a left side elevation view of the headrest-mounted monitor and headrest of FIG. 7, illustrating the screen structure pivoted outward from the housing.
Figure 13A:
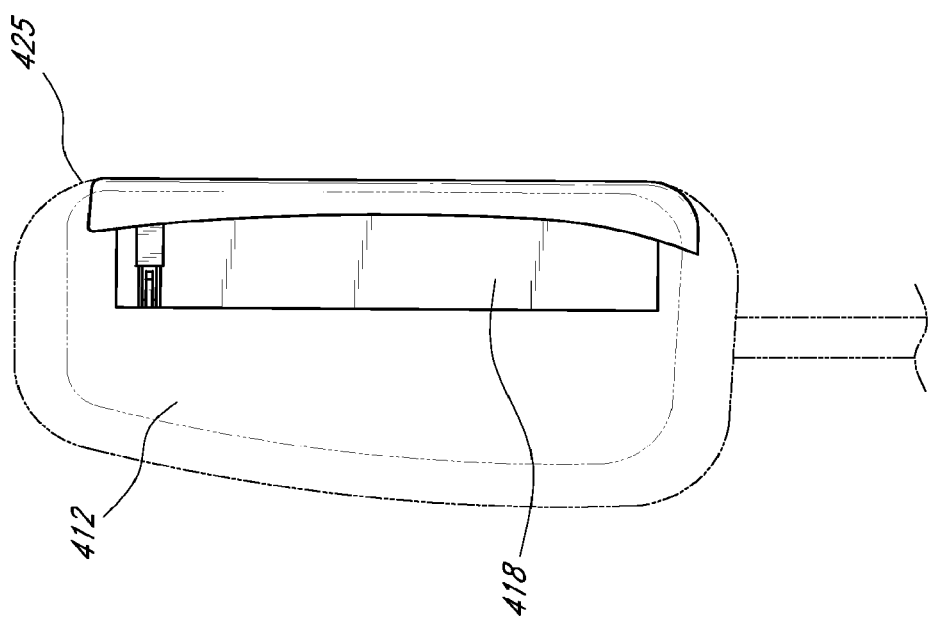
FIG. 13A is a left side elevation view of the headrest-mounted monitor and headrest of FIG. 7, illustrating the screen structure in a storage position.

As shown in FIGS. 10, 11A and 11B, the monitor 410 includes a screen structure 416 that is pivotably attached to a housing 418. Both the housing 418 and an outer casing of the screen structure 416 are preferably constructed of a high-strength plastic, so that the monitor 410 is lightweight and durable. The housing 418, which is embedded in the headrest 412 as shown in FIGS. 7, 13A and 13B, includes a cavity 420 (FIGS. 9, 10, and 11B) defining a storage space for the screen structure 416. The cavity 420 is substantially the same size and shape as the screen structure 416, such that when the screen structure 416 is in the storage position of FIGS. 11A and 13A, a front face 422 of the screen structure 416 is substantially flush with an outer surface 424 of the housing 418, which is in turn substantially flush with a surface 425 of the headrest 412 (FIG. 13A). The monitor 410 thus preferably protrudes only minimally or not at all from the headrest 412.

In the illustrated embodiment, the screen structure 416 includes a front portion 426 (FIGS. 8A and 8B) that is a substantially rectangular parallelepiped, and a rear portion 428 that tapers inward from the front portion 426 toward a rear face 430. Each of the left and right faces 432, 434 of the screen structure 416 includes a first hinge portion 436 adjacent a top face 438 of the screen structure 416. Each hinge portion 436 comprises a substantially flat bar 440 defining a plane that is parallel to a side faces 432, 434 of the screen structure 416. The bar 440 is pivotably secured at a first end 442 to the side faces 432, 434 of the screen structure 416, such that the bar 440 is pivotable in the plane defined by the bar 440. The first hinge portions 436 cooperate with second hinge portions 444 (FIGS. 9A-9C) on the housing 418 to pivotably secure the screen structure 416 to the housing 418, as described in detail below. The illustrated first hinge portions 436 are preferred, because they simplify the assembly of the monitor 410, as explained below. However, those of skill in the art will appreciate that a variety of alternate hinge constructions could be used and still achieve a number of advantages of the present monitor 410.

The front surface 422 of the screen structure 416 (FIG. 7A) includes a viewing screen 446 that displays images to passengers. As shown in FIGS. 8A and 8B, the screen structure 416 includes an input cable 448 for receiving an input signal to control the images displayed on the viewing screen 446. A first end 450 of the cable preferably includes a multi-pin connector 452 that enables a variety of input devices to selectively communicate with the monitor 410.

The monitor 410 further includes a plurality of controls for determining characteristics of the displayed images. For example, one control preferably enables power to be selectively applied to the monitor 410. Other controls preferably enable a viewer to select between various input sources for the monitor 410, such as a television tuner, a DVD player, a video game system, etc. Other controls preferably enable adjustment of qualities of the screen images, such as brightness, sharpness, contrast, etc.

In the illustrated embodiment, a first cluster of manual controls 454 is located on the front face 422 of the screen structure 416, and a second cluster of manual controls 456 is located on the outer surface 424 of the housing 418 adjacent the screen structure 416. The front face 422 of the screen structure 416 further includes an infrared sensor 458 for receiving signals from a handheld wireless remote control unit (not shown). Those of skill in the art will appreciate that all controls may be located on the screen structure 416, or all controls may be located on the housing 418. Alternatively, the monitor 410 may include no integrated manual controls, such that the monitor 410 is controllable using only a handheld wired or wireless remote control unit.

An interior of the screen structure 416 preferably includes at least one speaker 459 that produces audible sounds that accompany the images displayed on the screen 446. At least one of the controls 454, 456 on the monitor 410 or on an optional remote control unit preferably enables adjustment of a volume level produced by the at least one speaker 459. The rear face 430 of the screen structure 416, shown in FIG. 8B, includes apertures 460 that enable sounds produced by the speaker 459 to be heard clearly by passengers. Those of skill in the art will appreciate that the apertures 460 are not necessary to achieve many advantages of the present monitor 410.

Those of skill in the art will also appreciate that the monitor 410 need not include a speaker 459. The monitor 410 could, for example, be connected to the vehicle's sound system such that sounds from the monitor 410 are produced by speakers mounted in the vehicle's interior. However, front seat passengers, who are not in a position to view the images on the monitor 410, may wish to listen to, for example, a radio broadcast through the vehicle's sound system. Therefore, providing at least one speaker 459 in the monitor 410 enables rear seat passengers to listen to sounds produced by the monitor 410, and front seat passengers to listen to sounds produced by the vehicle's sound system. To eliminate any dissonance created by two sources of different sounds, the monitor 410 could also include a headphone jack so that only backseat passengers wearing headphones can hear sounds produced by the monitor 410.

As shown in FIGS. 9A-9C, 11A, and 11B, front edges of the housing 418 extend outward and backward, thus creating a rim 462 around the cavity 420 having a front face 464 and side faces 466, 468, 470, 472 that are substantially parallel to side faces of the cavity 420. The rim 462 increases the rigidity of the housing 418 without substantially increasing its weight or volume. In the illustrated embodiment, a portion of the front face 464 of the rim 462 adjacent a lower right edge 468 of the housing 418 includes a plurality of apertures 474. The apertures 474 are adapted to house controls, such as buttons or knobs, for adjusting various aspects of the monitor 410, as described above. Those of skill in the art will appreciate that the apertures 474 are not necessary to achieve all the advantages of the monitor 410, since controls may be mounted on the screen structure 416 or on a remote control unit.

A floor 476 of the cavity 420 preferably includes a plurality of apertures 478 (FIG. 9A) that cooperate with mounting hardware, such as screws, to secure the housing 418 to the headrest 412. The floor 476 preferably also includes an aperture 480 of sufficient size to allow the input cable 448 to pass through the floor 476 without interference. A top surface 482, bottom surface 484 and opposing side surfaces 486 extend upward from the floor 476. The floor 476 protects the monitor 410 and the headrest 412 during use.

Adjacent the top surface 482, each side surface 486 of the cavity 420 includes a second hinge portion 444 (FIGS. 9A-9C) that cooperates with one of the first hinge portions 436 on the screen structure 416 to pivotably secure the screen structure 416 to the housing 418. Each second hinge portion 444 comprises a slot having a width substantially equal to a thickness of the bar 440 of the first hinge portion 436. The bar 440 is thus slidable within the slot. With the bar 440 disposed within the slot, a position and orientation of the bar 440 is fixed relative to the housing 418. However, because the bar 440 is rotatable with respect to the screen structure 416, the screen structure 416 is pivotable with respect to the housing 418.

A tab 488 within the slot cooperates with an aperture 490 (FIG. 8A) on the bar 440 to lock the bar 440 within the slot. The tab 488 is cantilevered and attached to a side edge 492 of the floor 476 of the cavity 420. The tab 488 includes a forward facing tapered portion 494 (FIG. 9C) that terminates in a ledge 96 that is perpendicular to a longitudinal axis of the tab 488 and faces away from the rim 462. As the bar 440 is inserted within the slot, the bar 440 slides along the outside of the tab 488, and the bar 440 urges the tab 488 inward due to interengagement of the bar 440 with the tapered surface 494. As a leading edge 498 (FIG. 8A) of the bar 440 reaches a rear end of the slot, the tab 488 snaps into position within the aperture 490 of the bar 440. The ledge 496 abuts an edge of the aperture 490, thus locking the bar 440 within the slot and securing the screen structure 416 to the housing 418. The present monitor 410 is thus easy to assemble. The bars 440 are simply inserted into the slots until the tabs 488 lock into place within the apertures 490.

While the illustrated second hinge portions 444 are preferred for their ease of assembly together with the illustrated first hinge portions 436, those of skill in the art will appreciate that the illustrated second hinge portions 444 are merely exemplary. A variety of alternate hinge constructions could be used to achieve many advantages of the present monitor 410.

Preferably, the first and second hinge portions 436, 444 are located near an upper edge 438, 482 of the screen structure 416 and housing 418, respectively. The upper edge 438 of the screen structure 416 thus remains substantially fixed with respect to the housing 418, while a lower edge 500 of the screen structure 416 is capable of protruding substantially from the front face 422 of the housing 418, as shown in FIG. 11B. Preferably, a finger catch 502 (FIGS. 8A, 8B, 11A and 11B) extends downward from the lower edge 500 of the screen structure 416. The finger catch 502 provides a convenient surface against which a viewer may place his or her fingers to rotate the screen structure 416 with respect to the housing 418. Preferably, the lower edge 470 of the housing includes a cut out portion 504 (FIGS. 9A and 10) so that a viewer can reach behind the finger catch 502 to pull the screen structure 416 outward from the stowed position of FIG. 11A.

Advantageously, as the screen structure 416 pivots from the stowed position of FIG. 11A to the position of FIG. 11B, no portion of the rear face 430 of the screen structure 416 moves toward the floor 476 of the cavity 420. The floor 476 thus defines a limit for the monitor 410. No portion of the monitor 410, including the screen structure 416, extends beyond the floor 476 into the headrest 412. Thus, the overall monitor 410 occupies relatively little depth of the headrest 412, because the depth occupied by the monitor 410 corresponds roughly to the thickness of the screen structure 416.

With prior art monitors, such as the monitors disclosed in U.S. Pat. No. 5,267,775 to Nguyen, U.S. Pat. No. 5,507,556 to Dixon, and U.S. Pat. No. 5,842,715 to Jones, additional depth beyond the thickness of the screen structure would be required within a headrest to accommodate these monitors. As the screen structures of these monitors pivot from the stowed position to a viewing position, an upper edge of the screen structure would move backward into the headrest. This configuration is disadvantageous because limited space is available within a headrest.

The function of a headrest is to provide padding for comfort and safety. Thus, a headrest must comprise at least a minimum amount of padding. When a monitor is added to a headrest, padding is displaced. The padding may be eliminated entirely, but such elimination makes the headrest less comfortable and less safe. Alternatively, the padding may be retained but moved elsewhere within the headrest. Disadvantageously, this option makes the headrest larger. If the headrest is made wider, the extra width obstructs a larger portion of the driver's view. If instead the headrest is made deeper, (extends farther into rear passenger area) the portion of the headrest that protrudes into the rear passenger area presents an obstacle to rear seat passengers. Therefore, a headrest-mounted monitor desirably occupies minimal space.

Besides defining a thickness of the present monitor 410, the housing 418 also provides a self-contained casing for the monitor 410. The housing 418 thus protects the monitor 410 from impacts, for example. The housing 418 also facilitates installation and removal of the monitor 410. To exchange one monitor 410 for another, for example if the first monitor 410 is defective, the housing 418 and all of the components within the housing are easily removed from the headrest 412. A new monitor 410 is then easily installed by inserting the housing 418 of the new monitor 410 into the headrest 412.

As shown in FIGS. 10, 11A, and 11B, the monitor 410 includes a bracket 506 that limits a range of pivot of the screen structure 416 relative to the housing 418. The shape of the bracket 506, illustrated in FIG. 12, preferably resembles a straight wire 508 with an attached pair of L-shaped wires 510. Of course, the bracket 506 may be produced by many different processes such that the straight wire 508 and L-shaped wires 510 comprise one piece, or separate pieces attached to one another.

All three wires 508, 510, 510 are coplanar, and both L-shaped wires 510 extend from the straight wire 508 in the same direction. The upright portion 512 of each L-shaped wire 510 is substantially perpendicular to the straight wire 508, and the base portion 514 of each L-shaped wire 510 is substantially parallel to the straight wire 508. Further, the base portions 514 of each L-shaped wire 510 extend toward each other, and include a small gap 516 between their ends. The upright portions 512 of the L-shaped wires 510 are attached to the straight wire 508 such that opposite end portions of the straight wire 508, comprising posts 518, extend beyond the attachment points of the L-shaped wires 510.

The base portions 514 of the L-shaped wires 510, which define a first end 524 of the bracket 506, are pivotably retained within a tube 520 (FIGS. 9A, 10 and 11A-11B) on the floor 476 of the cavity 420. The tube 520 defines a first pivot opening and a second pivot opening. The posts 518 of the straight wire 508, which define a second end 526 of the bracket 506, are slidably retained within a channel 522 on the rear face 430 of the screen structure 416, as shown in FIGS. 8B, 11A and 11B. In the stowed position shown in FIG. 11A, the bracket 506 is substantially parallel to the rear face 430 of the screen structure 416. As the screen structure 416 pivots outward from the cavity 420, the base portions 514 of the L-shaped wires 510 pivot within the tube 520 and the posts 518 slide downward within the channel 522. As FIG. 11B illustrates, the posts 518 eventually reach a lower end of the channel 522, defining a maximum angle of the screen structure 416 relative to the housing 418.

Preferably, the hinges 436, 444 that pivotably connect the screen structure 416 to the housing 418 are self tensioning. Thus, the hinges 436, 444 retain the screen structure 416 in the position of FIG. 11B, and in any position in between the positions of FIG. 11A and FIG. 11B. A viewer can thus position the screen structure 416 anywhere between the limits of rotation to enjoy the optimum viewing angle. For example, the optimum viewing angle often depends upon the position of the sun. Glare from sunlight interferes with the viewer's ability to see images on the screen. Thus, the viewer can orient the screen structure 416 such that glare from sunlight is minimized. Furthermore, as the vehicle travels, its position and orientation with respect to the sun are continuously changing. At one moment, there may be little or no glare on the screen 446, and the next moment the vehicle may round a corner and suddenly there is a substantial glare on the screen 446. Because the present monitor 410 is positionable in a wide range of viewing angles, the monitor 410 enables the viewer to continuously adjust the angle of the screen structure 416 to avoid sun glare occasioned by variations in the vehicle's position and/or orientation with respect to the sun.

The present monitor 410 advantageously collapses toward the storage position (FIGS. 11A and 13A) when a force F is applied to the front surface 422 of the screen structure 416 as shown in FIGS. 11B and 13B. This feature is especially advantageous when a vehicle in which the monitor 410 is installed collides with another vehicle or brakes suddenly, for example. In these situations, a passenger seated behind the monitor 410 is often thrown forward, and may collide with the monitor 410. If the monitor 410 does not quickly collapse upon contact, the monitor 410 could injure the passenger.

As shown in FIG. 11B, the bracket 506 limits the rotation of the screen structure 416 relative to the housing 418. The length of the bracket 506 is fixed, and the first end 524 of the bracket 506 is constrained against translation. Therefore, a maximum angle that the screen structure 416 can be rotated from the stowed position of FIG. 11A coincides with a configuration wherein a longitudinal axis of the bracket 506 is perpendicular to the rear face 430 of the screen structure 416. In such a configuration, a force applied perpendicularly to the front face of the screen structure 416, such as the force F in FIG. 11B, would not have a component that acts on the bracket second end 526 in a direction parallel to the channel 522 and perpendicular to the bracket 506. Instead, the entire magnitude of the force would act in a direction parallel to the bracket 506, and would not cause the bracket second end 526 to slide upward within the channel 522, thus rotating the bracket 506 about its first end. In such a configuration, the bracket 506 would prevent the screen structure 416 from rotating back toward the storage configuration of FIG. 11A. The screen structure 416 would thus pose a danger to a passenger colliding with it, as in a crash or a sudden stop.

However, as explained above and illustrated in FIG. 11B, a lower end of the channel 522 in the rear face 430 of the screen structure 416 limits the travel of the bracket 506 within the channel 522 and prevents the bracket 506 from reaching the configuration wherein the bracket 506 is perpendicular to the rear face 430 of the screen structure 416. As shown in FIG. 11B, the maximum angle α between the bracket 506 and the rear face 430 of the screen structure 416 is preferably about 80°, and more preferably about 75°. In this configuration, the force F applied perpendicularly to the front face 422 of the screen structure 416 has a component that acts parallel to the channel 522, and a component that acts perpendicularly to the bracket 506. These force components cause the bracket second end 526 to translate upward within the channel 522, causing the bracket 506 to rotate about its first end 524 as the screen structure 416 collapses toward the storage configuration of FIG. 11A. The bracket 506 thus diminishes the injury-causing potential of the monitor 410 by enabling the screen structure 416 to pivot safely out of the way when a passenger collides with it.

Although the present invention has been described in terms of certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A mobile video system comprising:
  a video monitor configured to receive a video portion of an audiovisual signal from a video source separate from the video monitor;
  a first transmitter configured to wirelessly transmit an audio portion of the audiovisual signal to a first receiver, the first transmitter being mounted to the video monitor and configured to transmit at a first frequency band;
  a second transmitter configured to wirelessly transmit the audio portion to a second receiver different from the first receiver, the second transmitter being mounted on the video monitor and configured to transmit at a second frequency band different from the first frequency band; and a manually operated audio frequency selector operable so that the second transmitter optionally transmits the audio portion of the audiovisual signal at a third frequency band,
wherein the first frequency band, the second frequency band and the third frequency band do not overlap one another.

2. The mobile video system of claim 1, wherein the first receiver is a personal speaker system.

3. The mobile video system of claim 2, wherein the personal speaker system includes a headphone.

4. The mobile video system of claim 1, further comprising a remote control, wherein the manually operated audio frequency selector is mounted to one of the video monitor and the remote control.

5. The mobile video system of claim 1, wherein the video source comprises a DVD player.

6. The mobile video system of claim 1, wherein the video source comprises a video game console.

7. The mobile video system of claim 1, wherein the first transmitter comprises a radio frequency transmitter.

8. The mobile video system of claim 1, wherein the first transmitter comprises an infrared transmitter.

9. The mobile video system of claim 1, wherein the second receiver is radio operable so as to receive one of the audio portion of the audiovisual signal transmitted by the second transmitter and a broadcast radio station signal.

10. The mobile video system of claim 1, further comprising an audio frequency indicator mounted to the video monitor and configured to provide a visual signal of the transmission frequency band selected by the manually operated audio frequency selector.

11. The mobile video system of claim 4, further comprising an audio frequency indicator mounted to the remote control and configured to provide a visual signal of the transmission frequency band selected by the manually operated audio frequency selector.

12. The mobile video system of claim 1, wherein the video source includes an audio output, the mobile video system further comprising a jack separate from the video source and the video monitor and configured to be connected to the audio output of the video source and the first transmitter.

13. The mobile video system of claim 1, wherein the video monitor is configured to be mounted into a headrest of a seat, wherein the headrest is configured to be coupled detachably to the seat.

14. The mobile video system of claim 1, further comprising a seat having a headrest with the video monitor mounted thereon, wherein the headrest is integral with the seat.

15. The mobile video system of claim 1, wherein the video monitor includes:
a housing sized and shaped to be substantially positioned within a headrest, the housing including a first hinge portion and defining a storage cavity; and
a screen structure sized and shaped to be substantially positioned within the storage cavity, the screen structure including a second hinge portion configured to cooperate with the first hinge portion to pivotably secure the screen structure to the housing.

16. The mobile video system of claim 1, wherein the first transmitter is configured to transmit the audio portion of the audiovisual signal to a speaker connected to a radio of a motor vehicle.

17. The mobile video system of claim 16, wherein the first transmitter is a frequency modulation (FM) transmitter.

18. The mobile video system of claim 1, wherein the video monitor further comprises an input cable comprising a multi-pin connector.

19. The mobile video system of claim 1, wherein the manually operated audio frequency selector is mounted to the video monitor.

20. The mobile video system of claim 19, wherein the manually operated audio frequency selector is included in a cluster of manual controls mounted to the video monitor.

* * * * *